United States Patent
Helles et al.

(10) Patent No.: US 7,698,277 B2
(45) Date of Patent: Apr. 13, 2010

(54) QUERY PROCESSOR, QUERY PROCESSOR ELEMENTS AND A METHOD OF ESTABLISHING SUCH A QUERY PROCESSOR AND QUERY PROCESSOR ELEMENTS AND A DOMAIN PROCESSOR

(75) Inventors: Morten Helles, London (GB); Esben Krag Hansen, Birkerød (DK)

(73) Assignee: Kapow ApS (DK)

( * ) Notice: Subject to any disclaimer, the term of this patent is extended or adjusted under 35 U.S.C. 154(b) by 506 days.

(21) Appl. No.: 10/450,792

(22) PCT Filed: Dec. 14, 2000

(86) PCT No.: PCT/DK00/00700

§ 371 (c)(1),
(2), (4) Date: Jun. 16, 2003

(87) PCT Pub. No.: WO02/48906

PCT Pub. Date: Jun. 20, 2002

(65) Prior Publication Data

US 2004/0030685 A1    Feb. 12, 2004

(51) Int. Cl.
   *G06F 17/30*    (2006.01)
(52) U.S. Cl. ........................................... 707/10
(58) Field of Classification Search ............... 707/3, 707/103 R, 100, 103; 715/749
   See application file for complete search history.

(56) References Cited

U.S. PATENT DOCUMENTS

| | | | | |
|---|---|---|---|---|
| 5,999,940 A | * | 12/1999 | Ranger | .................. 707/103 R |
| 6,073,170 A | * | 6/2000 | Sumita et al. | ................ 709/218 |
| 6,085,186 A | * | 7/2000 | Christianson et al. | .......... 707/3 |
| 6,175,206 B1 | * | 1/2001 | Ueno et al. | .............. 318/568.1 |
| 6,301,584 B1 | * | 10/2001 | Ranger | .................... 707/103 R |
| 6,564,210 B1 | * | 5/2003 | Korda et al. | .................... 707/3 |
| 6,674,450 B1 | * | 1/2004 | Toub et al. | .................. 715/749 |

FOREIGN PATENT DOCUMENTS

| WO | WO 0074294 | 7/2000 |
|---|---|---|
| WO | 00/73942 | 12/2000 |

OTHER PUBLICATIONS

International Search Report; PCT/DK00/00700; Sep. 14, 2001.

(Continued)

*Primary Examiner*—Don Wong
*Assistant Examiner*—Sheree N Brown
(74) *Attorney, Agent, or Firm*—Cantor Colburn LLP

(57) ABSTRACT

A domain processor includes at least one robot modeler, at least one domain modeler, and at least one Query Processor Modeler. The robot modeler includes means for modeling at least one computer-based robot, the robot adapted for accessing at least one web-based data source including entities in a predefined domain. The domain modeler includes means for modeling at least one domain model and means for establishing at least one extraction model and at least one storage model. The Query Processor Modeler includes means for selecting at least two Query Processor elements from a set of predefined query processor elements, means for combining the selected Query Processor elements, and means for executing the associated query processor elements on at least one computer system, at least one of the query processor elements of the associated query processor elements being a Robot query processor Element adapted for accessing the web-based data source.

6 Claims, 10 Drawing Sheets

OTHER PUBLICATIONS

European Patent Application No. 00 984 910.0-2211 Examination Report dated Nov. 11, 2008.

Hyacinth S. Nwana, "Software Agents: An Overview," Knowledge Engineering Review, vol. 11, No. 3, Oct./Nov. 1996, pp. 205-244, XP000826898.

* cited by examiner

QUERY PROCESSOR, QUERY PROCESSOR ELEMENTS AND A METHOD OF ESTABLISHING SUCH A QUERY PROCESSOR AND QUERY PROCESSOR ELEMENTS AND A DOMAIN PROCESSOR

TECHNICAL FIELD OF INVENTION

The invention relates to a query processor, query processor elements and a method of establishing such a query processor and query processor elements and a domain processor.

DESCRIPTION OF RELATED ART

The invention deals with accessing, i.e. reading and/or writing in data sources associated with a certain domain. The data sources are typically web-based which basically means that the data of the data source are made available to the user according to a serial transfer protocol, e.g. http via the Internet. The serial transfer of the data made available to the user is sometimes easily conceivable to a user, especially when dealing with a simple and quite specific request. A problem with data retrieval from web-based data sources is that the user must typically find one or several data sources comprising the relevant data. This search may be very time consuming and typically non-exhaustive due to the fact that several data sources may easily be overlooked. Moreover, the user has to perform further queries on each site and these queries typically have to be made different from site to site.

This problem has been dealt with in the prior art by applying robots and agents with the purpose of collecting information within a certain domain of interest and by providing these domain data or an extraction of the data to a user in a more straightforward searchable way.

A problem with the known systems applying agents is that the agents require some kind of knowledge about the data source structure, and the use of the agent requires the accept of the owner of the data source due to the fact that an agent may dig into a data source more or less out of control.

Another problem with the known systems applying robots is also that the robots require some kind of knowledge about the data source structure, e.g. knowledge of the structure of data containing an HTML table of a web-based data source, and if this knowledge is not available, the programming of such robot is quite difficult. Hence, the applicable number of robots retrieving data from such data sources is limited as is the data of interest in the domain.

BRIEF SUMMARY OF THE INVENTION

The invention relates to domain processor (DP) comprising
at least one robot modeler (RM)
at least one domain modeler (DMR),
at least one Query Processor Modeler (QPM)

said robot modeler (RM) comprising
  means for modeling at least one computer-based robot (R),
  said at least one robot (R) being adapted for accessing at least one web-based data source (DS),
  said at least one data source (DS) comprising entities comprised in a predefined domain (D), said at least one domain modeler (DMR) comprising
  means for modeling at least one domain model (DM) associated with at least one chosen domain, said domain model (DM) comprising at least one extraction model (EM) and at least one storage model (STM),
  means for establishing at least one extraction model (EM) associated with a chosen domain,
  means for establishing at least one storage model (STM) associated with said chosen domain, said at least one Query Processor Modeler (QPM) comprising
  means for selecting at least two Query Processor elements (QPE) from a set of predefined query processor elements (QPE),
  means for combining at least two of the selected Query Processor elements (QPE),
  means for executing said associated query processor elements on at least one computer system (CS),
  at least one of said query processor elements (QPE) of associated query processor elements being a Robot query processor Element (RQPE) adapted for accessing at least one web-based data source (DS).

When the domain processor (DP) comprises at least one query processor maintenance manager (QMM), said at least one query processor maintenance manager (QMM) comprising means for executing at least one query processor (QP) established by the domain processor, an advantageous embodiment has been obtained.

According to the invention, the domain processor may advantageously comprise a tool for running a query processor established by the domain processor. The query processor maintenance manager may thus be adapted for running the query processor on one or several servers.

Such a manager may include a visual tool illustrating the running state of the query processor and the individual elements. An example of such intuitive processing is that the individual elements change color according to their state, e.g. within a color range from white to red, depending on the load of the elements.

Moreover, the manager should preferably illustrate basic on-off conditions visually, i.e. illustrate actively if an element is working properly, and whether entities are transferred between the query processor elements and whether entities may actually be transferred between elements. The latter feature may ease operation of the system significantly due to the fact that the absence of an entity flow between the elements does not necessarily indicate that a fault-condition has occurred simply because the element is not queried.

Determination of a "clear road" between the elements may e.g. be established by forwarding dummy (testing) queries between elements at certain intervals.

Moreover, the Query Processor Modeler may include sub-menus facilitating specialized execution of the query processor.

Moreover, the invention relates to a robot modeler (RM) comprising
  means for modeling at least one computer-based robot (R),
  said at least one robot (R) being adapted for accessing at least one web-based data source (DS),
  said at least one data source (DS) comprising entities comprised in a predefined domain (D).

Moreover, the invention relates to a domain modeler (DMR) comprising
  means for modeling at least one domain model (DM) associated with at least one chosen domain, said domain model (DM) comprising at least one extraction model (EM) and at least one storage model (STM),
  means for establishing at least one extraction model (EM) associated with a chosen domain,
  means for establishing at least one storage model (STM) associated with said chosen domain.

Thus, a domain model represents a structured way of defining properties of different aspects of a domain.

A domain model may e.g. comprise an extraction model, i.e. a definition of relevant entities and attributes to be looked for in the web-based data source. It should be noted that the extraction model may primarily describe (or mask) the data source on the basis of text strings and combinations of such strings.

A chosen domain may e.g. be "cars offered for sale".

When the domain modeler comprises means for establishing reference mapping between extracted data obtained according to said extraction model (EM) and a conceptual representation of said data, a further advantageous embodiment of the invention has been obtained.

When said reference mapping defines a set of reference entities describing a number of entities (E), said entities having attributes, a further advantageous embodiment of the invention has been obtained.

A set of reference entities may e.g. be a product catalogue.

Reference mapping may facilitate the possibility of adding knowledge to the retrieved entities. Such information may e.g. be information deducible from a reference product catalogue. Thus, if an entity is matched to an entity type of the product catalogue, the entity may be modified, e.g. as a validation, corrected or inserted as additional information about the entity.

A correction may e.g. be that one of the attributes of the Porsche retrieved above is false according to the product catalogue. This false attribute may be detected in several different ways within the scope of the invention. The reference product catalogue may e.g. initially reveal that no Porsche having a 3.0 liter engine has been made with diesel engine. Moreover, the product catalogue may reveal that no Porsche has been made with a diesel engine, thereby raising the probability that the data source provider has made a mistake. The wrong attribute "Diesel" may then be corrected.

Furthermore, the reference entities may be applied for different variants of classification and validation.

When the domain modeler (DMR) comprises means for establishing at least one language domain dictionary (LDD), a further advantageous embodiment of the invention has been obtained.

When said at least one language domain dictionary (LDD) maps the language of the extracted entities into the general language of the query processor (QP), a further advantageous embodiment of the invention has been obtained.

The general language of the query processor may e.g. be regarded as the "language" defined by an object-oriented conceptual model associated with the query processor. Such language may e.g. be a preferred language or coding chosen as the general language. Hence, the language domain dictionary may e.g. make it possible to have an entity that reads read "wagen" or "bil" transformed into an instance of an object "car".

When, said domain modeler (DMR) comprises means for establishing a set of reference recognition patterns, a further advantageous embodiment of the invention has been obtained.

The set of reference recognition patterns may e.g. comprise character patterns (also known as regular expressions) or character structures (even pictures) to be applied when identifying attributes and entities, e.g. Ltd., Corp or A/S indicating that a company attribute or entity is associated with the character pattern in English, American English and Danish, respectively.

Evidently, such reference patterns will typically be domain specific or at least language specific.

Moreover, the invention relates to a query processor modeler (QPM) comprising means for selecting at least two Query Processor elements (QPE) from a set of predefined query processor elements (QPE), means for combining at least two of the selected Query Processor elements (QPE), means for executing said associated query processor elements on at least one computer system (CS), at least one of said query processor elements (QPE) of the associated query processor elements being a Robot query processor Element (RQPE) adapted for accessing at least one web-based data source (DS).

According to the invention, a domain-accessing system may be established by means of general components. Moreover, the components may rely on general knowledge about the domain of interest, thereby facilitating very fast establishment of domain-accessing systems.

When the Query Processor Modeler comprises a graphical user interface (GUI) in the form of a visual programming tool, a further advantageous embodiment of the invention has been obtained.

When said set of query processor elements (QPE) comprises at least two different types of query processor elements at least one type being a robot query processor element (RQPE) and at least one type being a trigger query processor element (TQPE), a further advantageous embodiment of the invention has been obtained.

Moreover, the invention relates to a query processor maintenance manager (QMM) comprising means for executing at least one query processor (QP) established by the domain processor.

According to the invention, the query processor maintenance manager should be adapted for controlling the processing of an established query processor.

When said maintenance manager (QMM) comprises means for monitoring the state of at least one query processor element (QPE) or the performance of at least one query processor element (QPE), a further advantageous embodiment of the invention has been obtained.

When said domain processor maintenance manager (QMM) comprises means for evaluating the data flow between query processor elements (QPE) of a query processor path, a further advantageous embodiment of the invention has been obtained.

When said domain processor maintenance manager (QMM) comprises means for running and visual monitoring of the individual modules of a query processor, a further advantageous embodiment of the invention has been obtained.

When said domain processor maintenance manager (QMM) comprises means for running and visual monitoring of a query processor (QP) on element basis, a further advantageous embodiment of the invention has been obtained.

According to the invention, the elements may be advantageously monitored as visually separated elements.

Moreover, the invention relates to a web-robot, said robot comprising means for extracting information from web-based data sources (DS) in dependency of at least one extraction model (EM), said at least one extraction model comprising reference data structures defining entities and/or entity structures of data sources in a domain.

When said robot comprises at least one exchangeable plug-in, said plug-in comprising retrieving routines adapted for reading knowledge stored in said extraction model, said knowledge preferably being domain-specific, a further advantageous embodiment of the invention has been obtained.

When said plug-in defines reference mapping between extracted data obtained according to said extraction model (EM) and conceptual representation of said data, a further advantageous embodiment of the invention has been obtained.

When said extraction model (EM) is shared between at least two robots, a further advantageous embodiment of the invention has been obtained.

Moreover, the invention relates to a query processor (QP), said query processor (QP) comprising a set of web-based data sources (DS), wherein at least two of said data sources (DS) comprise entities according to a domain model (DM), said query processor (QP) comprising at least three query processor elements (QPE), at least two of said query processor elements (QPE) comprising
 a robot (RQPE)
 said robot (RQPE) being attached to at least one data source (DS)
 said robot comprising means for accessing information from the at least one data source (DS) according to at least one extraction model (EM) associated with said robot (RQPE),
at least one of said query processor elements (QPE) comprising
 a trigger (TQPE)
 said trigger query processor element (TQPE) comprising means for establishing a query.

The web-based data sources are typically independent.

The trigger element may be both manually and automatically driven, i.e. by a query user or an automated query routine.

When, at least one of the query processor elements (QPE) comprises a transformer query processor element (TAQPE), a messenger query processor element (MESQPE) or a mediator query processor element (MQPE), a further advantageous embodiment of the invention has been obtained.

Moreover, the invention relates to a method of establishing at least one query processor (QP), said query processor (QP) comprising a set of web-based data sources (DS), wherein at least two of said data sources (DS) comprise entities according to a domain model (DM), said query processor (QP) comprising at least three query processor elements (QPE), at least two of said query processor elements (QPE) comprising
 a robot (RQPE),
 said robot comprising means for accessing information from the at least one data source (DS) according to at least one extraction model (EM) associated with said robot (RQPE),
at least one of said query processor elements (QPE) comprising
 a trigger (TQPE),
 said trigger query processor element (TQPE) comprising means for establishing a query.
 said method comprising the step of
 attaching at least one selected robot query processor element (RQPE) to at least one of the data sources (DS) of the domain,
 combining the selected query processor elements into a query processor (QP) by means of a graphical user interface (GUI).

It should be noted that the data source may both be regarded as an internal part or an external part of the query processor within the scope of the invention, depending on whether the associated data source is defined by its data or not.

When said graphical user interface (GUI) defines a query processor element path visually on a drag- and drop basis, a further advantageous embodiment of the invention has been obtained.

When at least one of the combined query processor elements (QPE) comprises a transformer query processor element (TAQPE), a messenger query processor element (MESQPE) or a mediator query processor element (MQPE), a further advantageous embodiment of the invention has been obtained.

Moreover, the invention relates to a method of establishing at least one query processor (QP), said query processor comprising means for accessing data from web-based data sources (DS) of a domain by means at least one user interface (UI)

said method comprising the steps of
 selecting a number of query processor element (QPE)
 at least one of said selected query processor elements (QPE) being a robot query processor element (RQPE),
 at least one of said selected query processor elements (QPE) being a trigger query processor element (TQPE),
 attaching at least one selected robot query processor element (RQPE) to at least one of the data sources (DS) of the domain,
 combining the selected query processor elements into at least one query path defining the data flow in the query processor (QP) between the user interface (UI) and the web-based data sources of the domain, said method comprising a further step of
 customizing the at least one individual robot query processor element (RQPE) to the corresponding attached data sources (DS),
 customizing at least one of the trigger query processor elements (TRPE) to the query processor (QP).

When, at least one of the combined query processor elements (QPE) comprises a transformer query processor element (TAQPE), a messenger query processor element (MESQPE) or a mediator query processor element (MQPE), a further advantageous embodiment of the invention has been obtained.

Moreover, the invention relates to a method of extracting data from a web-based data source (DS), said method comprising the steps of
 identifying and reading attributes and entities of a web-based data source,
 converting the read entities into instances of conceptual entities,
 verifying whether the read instances correspond with an entity reference base, (ERB).

According to the above-mentioned embodiment of the invention, very advantageous entity processing has been obtained.

A conceptual model may also include a storage database model.

When, the method comprises at least one step of verifying whether the read instances correspond with an entity reference base, (ERB) on the basis of entities represented in said conceptual entity-representing format, a further advantageous embodiment of the invention has been obtained.

According to the invention, very advantageous processing of entities has been obtained. Hence, a conceptual check of the data may be performed on compact represented data, thereby reducing processing significantly. Hence, according to the invention, the micro-interpretation of the read entities and attributes is made separately, and prior to macro-interpretation of the entities.

Micro-interpretation according to the invention may be regarded as the reading of individual string-based attributes on a web-based data source. According to the preferred embodiment of the invention, the combination of read string-based attributes into entities may also be regarded as micro-interpretation preformed according the extraction model.

An example of micro-interpretation work is e.g. the job (typically performed automatically by software-based routines) of determining whether a read attribute is a "Ford" or a "Fiat". A further example is the determination of whether an engine is a 75 or 155 Hp engine.

Entities held in an extraction format are typically string-based, e.g. Fiat, "Fiat", FIAT, FIATH, etc.

Entities held in an conceptual format are typically held in an object-like format. Hence Fiat, "Fiat", FIAT, FIATH are all represented as a Fiat-type in the conceptual format. Such a Fiat type may typically involve an integer representation of a Fiat in old databases whereas new databases may represent Fiat, "Fiat", FIAT, FIATH as a "Fiat".

Macro-interpretation according to the invention may typically be regarded as a syntax check performed on the basis of the complete and established instance. Such a check may e.g. be performed with the purpose of verifying whether the established instance of an entity is actually realistic, i.e. consistent.

Moreover, the conceptually held entities may easily be grouped and filtered and conceptual checks may evidently be performed relatively easily.

Conceptual representation of the entities according to the invention is typically a object-oriented representation.

An example of macro-interpretation work is e.g. the job (typically performed automatically by software-based routines) of determining whether read attributes combined into an entity "Fiat", "120 Hp" and 2.0 liter engine are actually valid. Such a check performed on the basis of a reference base of known (valid) entity types, i.e. a product catalogue, may moreover be performed with the purpose of adding information to the checked instances of entities. Such procedure may be regarded as a deduction of information exemplified by an instance of a car, "Fiat", "155 Hp" and 2.0 liter. When compared with a reference product catalogue associated with the car domain, such a car may be deduced to be a turbo version, i.e. "Fiat", "155 Hp", "2.0 liter" and TURBO.

According to the invention, macro-interpretation may be performed on instances held in a conceptual format.

When modifying the verified instances according to the entity reference base (ERB) by adding information associated with said instances corresponding to said entity reference base, a further advantageous embodiment of the invention has been obtained.

Hence, information may be added to the instances, e.g. by adding further attributes, or maybe modifying one or several attributes forming the instance of an entity slightly.

An example may e.g. be the above-mentioned deduction of information exemplified by an instance of a car, "Fiat", "155 Hp" and 2.0 liter. When compared with a reference product catalogue associated with the car domain, such a car may be deduced to be a turbo version, i.e. "Fiat", "155 Hp", "2.0 liter" and TURBO.

A storage model may typically be relational.

When correcting of the verified instances according to the entity reference base (ERB) by correcting information associated with said instances corresponding to said entity reference base, a further advantageous embodiment of the invention has been obtained.

Hence, instances may be corrected, e.g. by omitting attributes held in the instance or maybe modified by one ore several attributes forming the instance of an entity.

An example may e.g. be the above-mentioned deduction of information exemplified by an instance of a car, "Fiat", "120 Hp", 2.0 liter engine and Turbo. When compared with a reference product catalogue associated with the car domain, the verification of the instance may result in a correction of the "Turbo" attribute, as the verification procedure may both conclude (a): no 120 HP Fiat having Turbo is in the reference catalogue (b): a 120 HP Fiat without Turbo is most likely the true intended instance of a car. Consequently, a correction routine may correct the instance accordingly or discard the entity entirely.

Moreover, the invention relates to a method of establishing a query processor, said query processor being adapted for accessing data on at least two different web-based data sources, selecting at least two predefined query processor elements (QPE), combining the selected query processor elements into a desired query processor structure.

According to the invention, the overall structure of a query processor may be purely based on some basically intended design rules, i.e. a robot element must be assigned to a data source, a trigger must feature a manual user interface, a database element must contain retrieved database element, etc.

Such a conceptual design of a query processor should preferably be made by means of a graphically-based visual program, e.g. a drag and drop-like design program.

Evidently, this conceptual programming of a query processor may be made on the basis of more or less structured knowledge about the domain and the data sources of the domain.

Basically, such a design of a query processor represents the framework for the intended query processor.

The query processor elements basically represent different sub-frameworks which may all be designed and performed in separate structures or routines. Therefore, the design of query processors by means of different functional properties minimizes "error cross-talk" between the elements and the elements may advantageously be put together initially without dealing with complicated details of the individual elements.

A query processor according to the invention is established for accessing data of at least two different independent web-based data sources.

A further advantage of the above-mentioned method is that a break-down of the functional features of a query processor into standardized elements, which may be configurable, may easily be conceived by a programmer.

A further advantage of the invention is that utilization of standardized elements facilitates the possibility of pre-configuring different variants of a certain element type, thereby offering the possibility of inserting a pre-configured element to the user.

An example of such pre-configuration of elements may e.g. be a trigger element. Within the (type) group of trigger elements, several variants may be pre-established with great advantage if such trigger elements are utilized often. Therefore, a programmer may e.g. apply a trigger element predefined for trigging a query at certain time intervals. Other types of trigger elements may e.g. be triggers comprising a statistic module applicable for trigging a query according to different system parameters. A third possible type of triggers may e.g. be a manually operated trigger intended for establishment of a query in corporation with a manually operated user interface.

Basically, the invention offers a high-level language facilitating easy web-based access.

When said at least two predefined query processor elements have different functional characteristics, an advantageous embodiment of the invention has been obtained.

Different functional characteristics may e.g. be elements functioning as converters, triggers, caches, robots.

Hence, a query processor according to the invention may be established by means of standardized "bricks", thereby doing away with the establishment of a web-oriented query processor being extremely complicated.

When modifying the selected query processor elements according to the data structure of said web-based data sources, a further advantageous embodiment of the invention has been obtained.

According to the invention, the different elements may be configured or designed independently. Hence, the individual elements may be established so as to fit the individual task(s) of the elements without inducing errors somewhere else in the processing system.

When said modification of the selected query processor elements comprises at least one plug-in software module, said at least one plug-in defining domain-specific properties of said element, a further advantageous embodiment of the invention has been obtained.

Hence, domain-specific plug-ins may initially be constructed, e.g. product catalogues, language dictionaries, as completely separate routines. Moreover, the individual elements may be ideally constructed, e.g. a robot, with no or only little knowledge of the language of the data source due to the fact that the basic structure and functioning of the robot is language independent. Product catalogues should likewise be domain specific.

Moreover, the individual elements may be established with different plug-ins.

Moreover, the invention relates to a method of establishing a domain-accessing routine, said domain comprising a plurality of web-based data sources, said method comprising the steps of establishing at least one robot ( ) adapted for retrieving entities stored on said plurality of web-based data sources, establishing at least one reference catalogue, establishing at least one procedure of verifying the retrieved entities by comparing the read entities with the at least one reference catalogue.

Thereby, an ideal way of retrieving information from a web-based data source has been obtained.

When said method comprising the steps of establishing at least one storage means establishing a data-exchanging interface between said at least one robot and at least one storage means, a further advantageous embodiment of the invention has been obtained.

When said reference catalogue is a product catalogue, a further advantageous embodiment of the invention has been obtained.

When said established procedure of verification comprises a modification of the retrieved entities if the verification procedure indicates or proves that a read entity is not valid according to the at least one reference catalogue, a further advantageous embodiment of the invention has been obtained.

Moreover, the invention relates to a query processor maintenance manager (QMM)

comprising at least one domain processor user interface (DPUI)

said manager (QMM) comprising means for evaluating different modules of at least one query processor (QP), said means for evaluating different subroutines of said query processor comprising means for monitoring the state of at least on query processor element (QPE).

Hence, the query processor may comprise means for monitoring at the robot element, a transformer element, a trigger element, a mediator etc.

When said processor comprises means for automatically forwarding messages to said at least one query processor user interface (DPUI) when certain predefined conditions are met, a further advantageous embodiment of the invention has been obtained.

The predefined conditions may e.g. be conditions determining that a transformer has failed to transform extracted entities into conceptual entities.

A further predefined condition may be that a maximum load of an element, e.g. a cache or a robot, has been exceeded.

When said manager (QMM) comprises means for modifying individual query processor elements/sub-routines, a further advantageous embodiment of the invention has been obtained.

The means for modifying individual query processor elements/sub-routines may e.g. comprise an editor for the robots or means for modifying plug-ins centrally.

An example of such an editor may e.g. be the interface of a Query Processor Modeler in which the individual query processor elements may be edited simply by clicking on the elements and thereby starting the editor related to the activated element. Such an editor may e.g. be a Robotmaker, if a robot is clicked on, or a domain modeler if a transformer element is clicked on.

When said manager (QMM) comprises means for modifying the query flow in the query processor during execution of the query processor, a further advantageous embodiment of the invention has been obtained.

When allowing realtime editing in the query processor, the up-time of the query processor may be maximized. This realtime editor should preferably comprise means for blocking differing query paths of the query processor without invoking fault conditions on the associated signal paths.

An example of means for modifying the query flow may e.g. comprise a mute element included in a query path. The activation of such a mute element may then cause the involved branch to be out of work, whereas the rest of the query processor may proceed unaffectedly, insofar that queries or entities (i.e. data) from the muted branch are significant to proceeding the query. Typically, the queries and entities missing from one branch of the query processor subroutine may be preferable over closing the complete query processor down.

Meanwhile, the elements of the muted branch, e.g. a robot or a transformer, may be "repaired" or updated without resulting in run-time errors.

A further advantageous variant of the above-mentioned modification may be a halt routine acting as the above-mentioned mute but including a memory which may catch and store queries, and subsequently resume processing by means of the cache and stored queries.

BRIEF DESCRIPTION OF THE DRAWINGS

The invention will be described below with reference to the drawings of which

DETAILED DESCRIPTION OF THE INVENTION

Figure 1A:
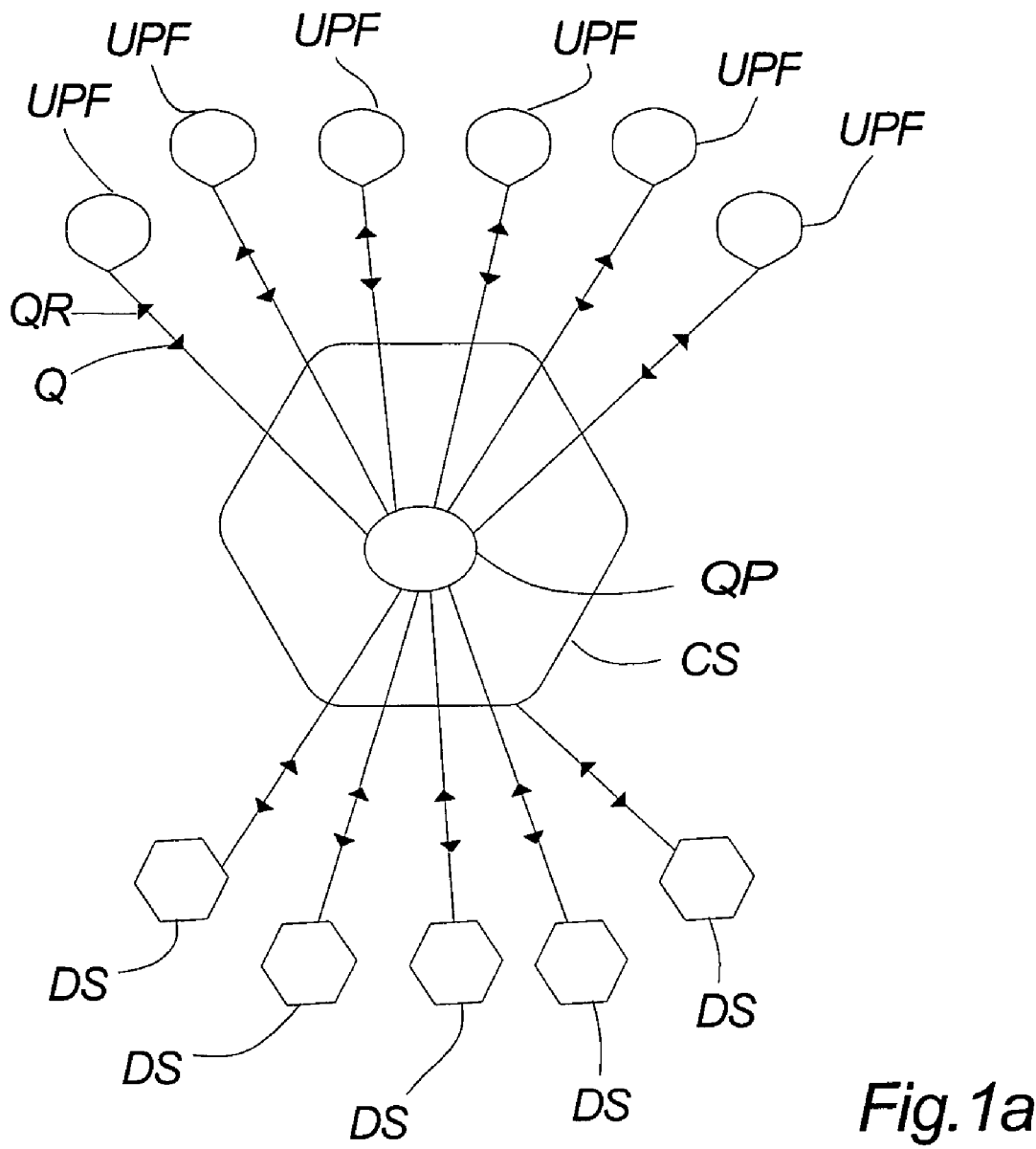
FIG. 1 illustrates some basic principles of a query processor system.

FIG. 1a illustrates the basic principles of a web-based market place.

A web-based market place generally comprises a number of web-based data sources DS. The data sources are e.g. web-sites associated with a homepage of a data source owner. Typically, the data are transferred according to a HTTP protocol. Other protocols, e.g. WAP protocol or HTTPS are also applicable.

The data sources DS are typically a database or they are powered by a database DB of the data owner.

It should be noted that a marketplace may moreover comprise non-web based data sources accessed by means of e.g. ODBC drivers.

The data sources offer information, products, services, etc. free or for sale.

According to the invention, a market place should technically deal with one domain only, but evidently, several domains may be overlaid and thereby offer a market place dealing with different domains.

An example of such domain may e.g. be a car market place. The cars of the domain are offered for sale on the individual web-based data sources DS, and the cars may be new or used. A domain may include different nationalities of data sources and be in many languages. On the other hand, a car market place offering used cars would typically only comprise cars offered for sale in one country.

Other exemplary domains may be jobs, services, stocks, odds, boats etc.

It should be noted that web-based access to the data sources facilitates a very broad covering of the entire domain due to the fact that web-based data sources may be accessed without any kind of corporation between the accessing part and the data source owner. Typically, the data sources will be independent.

According to the invention, the content of the data source of the domain will be regarded as entities. An entity has different properties, here defined as attributes.

An example of an entity is a specific car offered for sale, e.g. a Porsche, and attributes may be color, e.g. black, engine, e.g. 3.0 liters, etc.

Another example of an entity is a specific boat described by a number of suitable boat-describing parameters, or attributes, such as length, price, year, etc.

When reading a web-based data source DS, a combination of attributes will typically be read and interpreted as a car. Such reading of attributes may be regarded as an extraction of information from the web-based data source according to the invention.

The data sources DS may be accessed both by reading and/or writing.

The data sources may be accessed via a domain handling system, i.e. a processing system, implemented by software in hardware on the illustrated computer system CS. The computer system may comprise one central server or a number of coupled servers located centrally or decentrally. Such system may be regarded as a query processor QP. The query processor is adapted for querying the data sources automatically or upon request, a query Q, made by a user U. The request is performed by means of a user interface implemented on a user platform UPF.

Figure 1B:
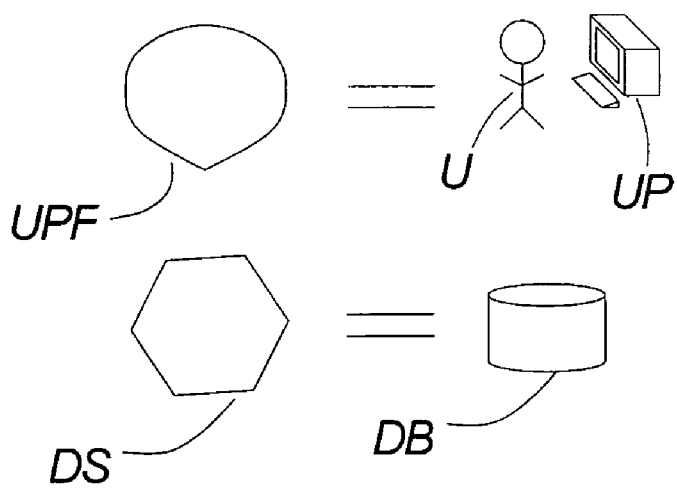

As illustrated in FIG. 1b, a User Platform UPF typically comprises a computer-based user interface which may be manually operated by a user U.

Hence, a user may forward a query Q to the data sources DS via the query processor QP. The query may be processed in many steps and the query processor QP may also include a data cache or a database for storing entities retrieved from the data sources DS for statistical purposes or for speeding up the query process.

The individual web-based data sources are accessed (i.e.: read and/or write) by means of robots attached to the data sources. Typically, one robot is uniquely to a corresponding data source DS.

The definition of a robot differs significantly from the somewhat popular definitions and the more scientific definitions.

The definition adapted in this application is that a robot is a kind of automatic process established with the purpose of accessing web-based data. A robot is a sub-arrangement of a so-called agent.

According to the invention, a robot is a software-based automatic process established with the purpose of accessing web-based data sources. According to the invention, a robot may even comprise some kind of intelligence embedded in the process establishing elements. It should be noted that a robot according to this definition may even be regarded as an agent by some practitioners within the art.

According to the invention, the agent has no personality, and it is not autonomous, nor mobile, in the sense that the agent is free to be transferred and processed on the local data source servers of the data source owners. A robot according to the invention is established for remote execution in relation to the data sources to be accessed and the robots will only be executed in a particular server environment. It should be noted that this particular environment may obviously include several servers located at different places.

Again, it should be noted that non-web-based data sources may be added if desired.

Figure 1C:
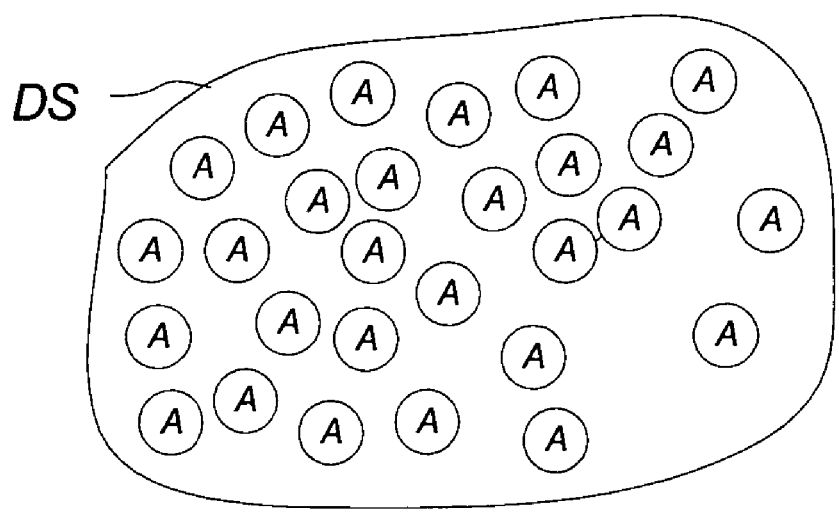

FIG. 1c illustrates the complex nature of a data source to be accessed according to the invention. The illustrated data source DS has a data structure which is initially unrevealed and incompatible with the access tools of the retrieving profile associated with the specific data source DS.

According to the illustrated embodiment, the character-based information of the data source DS has been converted into a number of attributes of identified text strings. Evidently, attributes may be encoded and decoded in various formats such as character based formats, image based formats and active content formats, such as Java applet, JavaScript application or VB script application.

The text strings may e.g. be a mix of text strings identifying car names, model names, numbers, etc.

Subsequently, the data source must be evaluated and interpreted according to an extraction model in order to facilitate access to hidden information by the retrieving profile RP.

Figure 1D:
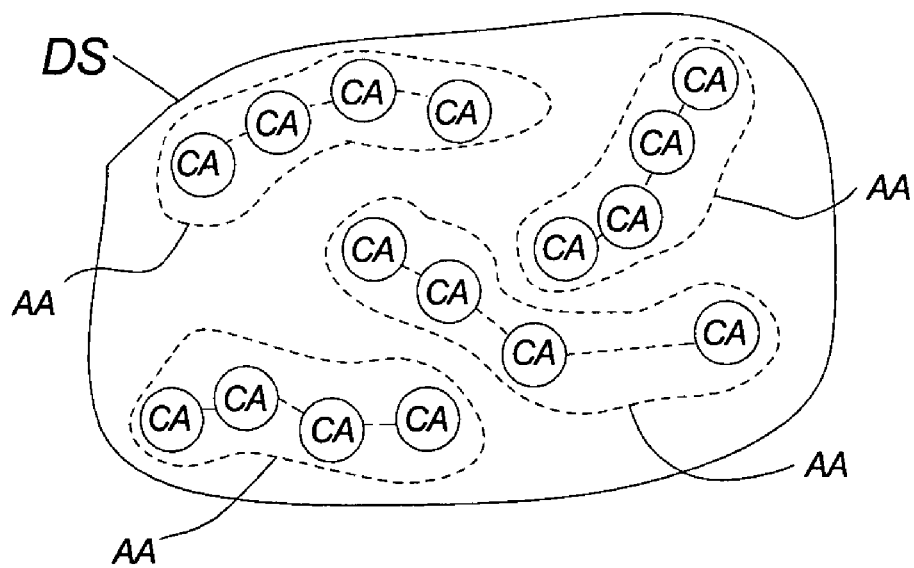

FIG. 1d illustrates identification and categorization of attributes of a data source according to the invention.

The attributes, i.e. the text strings of the data source, may subsequently be interpreted and combined into so-called entities of associated attributes ASA. The associated attributes may be established so as to comprise certain predefined types of attributes, i.e. categorized attributes.

An example of an entity is a car entity comprising the categorized attributes CA "Trabant", '88 and $100,000 where the first attribute of the category is car model, the second attribute of the category is manufacturing year and the third attribute of the category is the price. The above-mentioned entity may also be referred to as an instance of an extraction model. The extraction model defines and describes certain attributes and entities of interest for the domain.

Each entity is established as a set of associated attributes ASA and the irrelevant attributes are filtered away.

Evidently, the establishment of entities of associated attributes may be performed in several different ways, and more or less automatically, within the scope of the invention. It should be noted that the preferred embodiment of the invention implies a completely automatic establishment of as many robots as possible.

A detailed description of a semi-automatic robot establishment according to one embodiment of the invention is described with reference to FIGS. 7 to 9.

Subsequently, the identified entities may be copied into the central database DB means in such a way that the retrieving profile initially performs a query in the database instead of visiting every involved data source DS and lists the results to the user according to a predefined listing format. This feature ensures quick access to the search result. If the user U requires additional information, this information may be obtained by means of a link contained in the above-mentioned result list.

When the entities have been copied to the database and associated with the retrieving profile, further information is added to the retrieving profile in the form of a robot adapted to the data structure of the specific data source. This robot is associated with the retrieving profile in order to visit the data source according to certain trigger criteria and to reevaluate the data source in order determine whether the contents of the data source have been changed. Hence, the robot will access the data source e.g. at certain intervals and update the contents of the database if changes have occurred. Such an automatically handled change may take place if e.g. one entity has been removed from the data source and replaced by two other entities when the removed entity represents a sold car and the two new entities represent cars introduced for sale.

Such a change observed by the robot should of course be reflected in the database, as the sold car has to be removed and the two cars be added to the database in order to reflect the state of the data source when the data source is visited.

A change may likewise be stored and registered for statistic purposes in another database.

If, on the other hand, the data structure of the data source has changed in such a way that the robot is no longer able to extract the correct information, an error is reported to the retrieving profile. Such an error results in the establishment of a new robot fitting the new structure of the data source.

It should be noted that each data source typically requires a dedicated robot.

Figure 2:
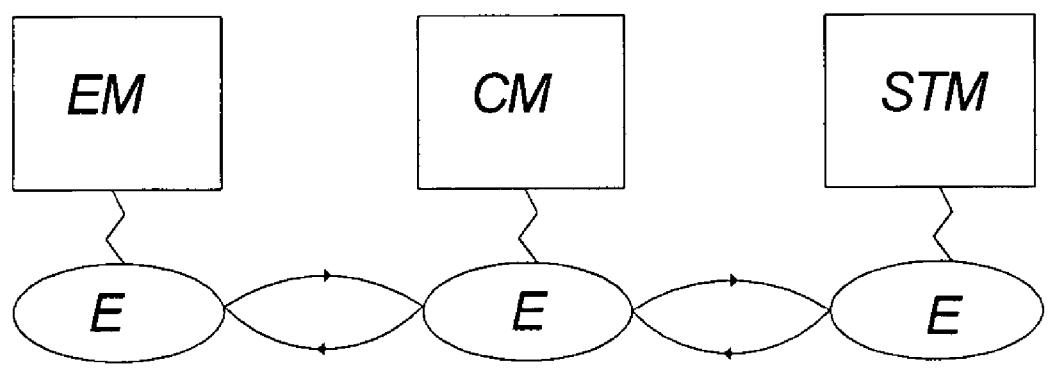
FIG. 2 illustrates a basic approach according to the invention when dealing with domain processing.

FIG. 2 illustrates three entity models applied in a preferred embodiment of the invention.

The three entity models are an extraction model EM, a conceptual model CM and a storage model STM.

For reasons of simplicity, entities according to the three models are referred to as extraction entities EENT, conceptual entities CENT and storage entities SENT. The entities are also referred to in three different formats, i.e. an extraction format, a conceptual format and a storage format.

The entity flow is transformed between the different formats by means of converters established for converting the data from one format into another. According to the invention, the converters may preferably be established as so-called transformer elements which will be dealt with in detail below.

Starting from the web-based data source end, upstream, the entities are accessed according to an extraction model preferably common for all involved data sources of the domain. The extraction entities simply comprise a serial stream of strings. According to the extraction model, the strings are ordered in such a way that the receiver of the string-stream may recognize what the transmitter actually intends to transmit. This may be established both with accompanying codes or simply as a convention defining the sequence.

In fact, the extraction model represents more than a data format. It also defines the different attributes which the robots should access when dealing with the different data sources. In other words, the extraction model represents a framework in which the designers may design the robots. The robot designers may therefore concentrate fully on designing a robot capable of accessing the attributes contained in the extraction model and on combining the attributes into entities according to the extraction model, i.e. extraction entities.

The extraction entities may nevertheless be established e.g. wholly or partly by automated extraction routines. In a certain web-based data source, such routines may e.g. be adapted for automatic reading the data source representation, automatic recognition of attribute patterns of the web-based data source, and outputting of these attributes as extraction entities according to the extraction model.

Moreover, such automated routines may evidently be adapted for assigning the specifically discovered attribute/entity patterns of a data source to a corresponding robot.

According to the preferred embodiment of the invention, the extraction model may be established by means of a domain modeler DMR.

The extraction entities may then be converted, e.g. by a transformer, into conceptual entities. Among other things, the conceptual model representation of an entity involves a conversion of the individual entity into a unique object. In a simplified manner, an extraction entity comprising a string stream of "Porsche", "Red", "3.0", "Diesel" is converted into a unique car object, a conceptual entity, being a Porsche which is red and with a 3.0 liter diesel engine.

The conceptual format moreover offers the possibility of handling the entities in a compact way. Now, the entities may be represented in an object-oriented manner instead of a flat string format.

Moreover, a conceptual approach to the entities offers the possibility of adding knowledge to the retrieved entities. Such information may e.g. be information deducible from a reference product catalogue. Thus, if an entity is matched with an entity type of the product catalogue, the entity may be modified, e.g. as a validation, a correction or as an insertion of additional information about the entity.

A correction may e.g. be that one of the attributes of the Porsche retrieved above is false according to the product catalogue. This false attribute may be detected in several different ways within the scope of the invention. The reference product catalogue may e.g. initially reveal that no Porsche having a 3.0 liter engine has been made with a diesel engine. Moreover, the product catalogue may reveal that no Porsche has been made with a diesel engine, thereby raising the probability that the data source provider has made a mistake. The wrong attribute "Diesel" may then be corrected.

Insertion of added information may e.g. be that the recognition of a Porsche of the above-mentioned type (now assuming that the diesel statement has not been made) has electronic injection. This information may then be inserted as a new attribute to the unique conceptual entity Porsche or in the fill-in of a text field attribute of the Porsche.

Validation comprises the step of evaluating whether the currently investigated conceptual entity should be regarded as a valid entity at all. Such validation may basically result in the fact that the entity is accepted as a valid entity or that the entity is discarded. Subsequently, a valid entity may be further processed with the purpose of deducing information about the entity described above.

A discarded entity may result in a further investigation of the original data source with the purpose of evaluating whether an entity has been overlooked. Evidently, a realtime evaluation of the discard rate of each data source should be performed with the purpose of monitoring whether the robot or the extraction model associated with the individual data source needs an update or replacement.

Typically, every possible attribute of a conceptual entity should be predefined in the conceptual model. According to a preferred embodiment of the invention, the conceptual entities and attributes should be established by means of a domain modeler.

The conceptual model should typically be made by people having a certain kind of knowledge about the domain. It should, nevertheless, be emphasized that the establishment of relevant attributes may be heavily supported by automated procedures traversing trough the domain and identifying the offered combinations of attributes.

The last entity model is the storage model. The storage model is primarily adapted for applying traditional database structures and database handling methods to the retrieved entities. Thus, the modeling of a storage model may be performed with very little knowledge of the nature of the domain but more or less by focussing on the involved attributes and entities.

Evidently, other entity format approaches may be applied within the scope of the invention. Specifically, the distinction between the different models may be softened up a little in the sense that the conceptual model and the data storage model may more or less be incorporated in one body.

Evidently, the invention features the possibility of performing centralized processing when data retrieved from the different data sources are represented according to a generalized entity model, e.g. a conceptual model.

The extraction format may be understood as an analogue format while the conceptual/storage format may be regarded as a digital format.

The extraction entities are typically entities extracted directly from the web-based data sources, the conceptual entities are typically the entities flowing in the heart of the query processor capable of more complex processing, and the storage entities are typically the entities represented in e.g. a relational database.

It should be emphasized that the different models, e.g. the above-mentioned extraction model EM, conceptual model CM and storage model STM may facilitate an entity flow both ways; downstream as described above from the data sources to the user querying the query processor, or upstream from a user submitting an entity or a request, e.g., an order to a certain data source.

If, for instance, a user wants to buy an item found in the domain, he may then submit an order associated with a chosen entity, e.g. a PC, car, etc. This order would comprise the selected item as a storage or conceptual entity which is subsequently converted in the query processor and submitted to the relevant data source according to the extraction model. An extraction model according to the invention may thus both be defined as a way of reading the data source and it may be defined as a way of writing (submitting) entities into the data source, e.g. by means of a form into a shopping cart of the data source or a data search form associated with the relevant data source.

Preferably, the two functions, reading and writing, should be supported by two separate distinct models for the purpose of clarity, i.e. one model for reading the data source, an extraction model, and one model for writing to a data source, a submission model.

The first format, the extraction format, is the format in which the entities are accessed in the web-based data source. This format is evidently a little fragile and unhandy due to the fact that this string-based entity stream is primarily based on transmission of data supposed to be entities and attributes of entities. This fragile extraction format may typically not be supported significantly by validity checks due to the fact that the extracted entities are difficult to process on a large scale. Such processing would involve major complex string-based processing.

The conceptual format is established on the basis of the predefined conceptual model defining the basic nature of the entities of the domain. The conceptual representation may fundamentally be regarded as an object-oriented representation of the read entities. A conceptual representation of the read entities is relatively easy to process in the sense that the entities are converted into unique instances of the conceptual model, thereby offering filtering, conversion or modification of any information related to the individual instances of predefined information, e.g. attributes, types of attributes etc. consistent with the conceptual model.

The storage format is basically intended for storing the retrieved entities for later access. The storage format represents a more handy representation of the retrieved entities of the domain in the sense that superfluous information, e.g. information contained in or related to the conceptual model may be omitted. Such information may e.g. be entity information utilized for converting the extraction entities into conceptual entities. Such information need no longer be present in the storage model as the entities are now conceived as unique entities.

The entities stored in a database according to the storage model may (and should) instead be used for statistical purposes.

The conceptual model and the storage model may be more or less overlapping but, preferably, these formats should be dealt with separately, thereby obtaining the possibility of reusing the storage model and even the conceptual model in other applications. Moreover, the strict separation between the applied data models facilitate the individual models to be modified individually without considering interaction with the other models under some circumstances. An example of such a simple modification of a model is the modification of a classification module which may basically be established without any modification of other modules as long as no new entity attributes have been introduced or removed.

A part of the extraction model may be global or at least multiple in the sense that this part of the model may contain general plug-ins of the extraction model applicable for many or all data sources to be accessed. An example of such general plug-ins may e.g. be a language dictionary defining different applicable languages, e.g. English, Japanese, French or Danish. Moreover, the language dictionary may contain a domain-specific dictionary focussing on the entities characterizing the domain.

Figure 3:
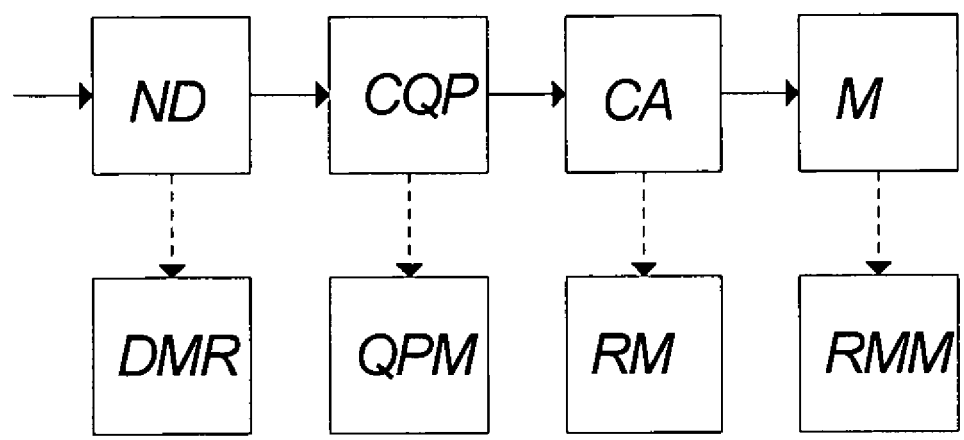
FIG. 3 illustrates the process of establishing a domain processor according to a preferred embodiment of the invention.

FIG. 3 illustrates the process of establishing a domain processor according to a preferred embodiment of the invention.

It should be noted that the establishment of the components and logistics needed for collecting data from a domain and the maintenance of the components may be performed in other ways within the scope of the invention.

Initially, the main steps to be introduced below with reference to FIG. 3 will be described shortly. A throughout discussion of the steps and the meaning of these steps will made below with reference to the subsequent figures.

Initially, it has been decided that a new domain must be established. This domain may e.g. be a domain comprising boats offered for sale which are either used or new.

The boats are offered for sale from different web-based market places, typically the homepage of a dealer or e.g. private homepages.

As discussed later, web-based data sources may be supplemented by e.g. direct reading in a dealer's database, e.g. by means of ODBC based reading. Nevertheless, the domain should basically always be located in at least two different web-based data sources.

Moreover, the web-based data source may typically be accessed without the consent or knowledge of the web-based data source owner. Consequently, there are no strict sign-up requirements by the data source owner. Therefore, the data fundament of the domain is huge, insofar it more or less includes all entities offered for sale in the complete worldwide web.

The decision that a new domain ND has to be made initially invokes the Domain modeler DMR to establish the characteristics of the domain. These characteristics are to be used when establishing the different technical measures needed for accessing the web-based data sources. Details of the functioning of the very important Domain Modeler DMR will be discussed later. It should be noted that the domain modeler may operate more or less automatically.

According to a preferred embodiment of the invention, the domain modeler DMR outputs a specific Domain model DM needed for the different software modules, also named elements, to be used when establishing the query processor for the domain. Hence, the elements described at a later point may advantageously utilize the domain model DM for different or overlapping purposes. The domain model DM may comprise a knowledge base describing different general features and aspects of the invention so to speak. Such a general knowledge "container" benefits from the fact that the knowledge describing the domain may be established centrally and thereby obtain a compact knowledge structure which may be modified centrally and basically without dealing with complicated details of the different query processor elements. Therefore, the domain model represents a knowledge structure that may be accessed by the different query processor elements simply by defining a so-called plug-in to the individual or some of the query processor elements. The plug-in may represent a domain reading structure, e.g. JAVA-code, adapted for reading a certain part of the domain suitable for the establishment and functioning of the element. Therefore, different elements may utilize different parts of the knowledge. Moreover, the centrally organized knowledge may be modified centrally, thereby inferring that all elements automatically utilize an updated knowledge base with little or typically no modification of the elements or the plug-ins.

According to the invention, some general knowledge may evidently be decentralized, i.e. put into the individual query processor elements. However, according to a preferred embodiment of the invention, the central knowledge base, or the domain model DM, should be maximized.

A domain model DM may e.g. comprise a reference product catalogue describing all known products of the domain, e.g. a list of different known car models and variants of such models.

Furthermore, the domain model DM may comprise mappings between different entity models applied by the query processor, e.g. conversion mappings between extraction entities, conceptual entities and storage entities.

Furthermore, the domain model may e.g. comprise the extraction, conceptual and storage models.

Also, the domain model may comprise language dictionaries, both domain-specific and more general dictionaries.

By applying a domain model, a change in the domain model may be reflected uniformly in the complete query processor.

The next step, Create Query Processor CQP, initiates the combination of different elements by means of a Query Processor Modeler QPM. Some of the elements combined by the Query processor Modeler QPM are established by the domain modeler DMR and some of the components are general pre-established elements. Other elements to be used may e.g. be robots intended for accessing the data of the individual sites.

The next step, Create Accessors CA, initiates the assignment of individual robots to specific data sources of the domain. A detailed description of such a robot-generating program may be found in PCT/DK00/00163 and PCT/DK00/00429 filed by the applicant and is hereby incorporated by reference.

The last step, Maintenance, involves the establishment of different procedures intended for maintaining the query processor. Such procedures may e.g. be establishment of a robot and system monitoring. Such monitoring may e.g. include the monitoring of the load of the software elements/modules and whether the robots actually fit the sites, etc.

Moreover, such procedures may include modifying or exchanging robots if such actions are considered necessary.

Evidently, the chronology of the above-mentioned steps may be modified within the scope of the invention, e.g. by establishing the robots before the query processor is combined in the Create Query Processor step.

Figure 4A:
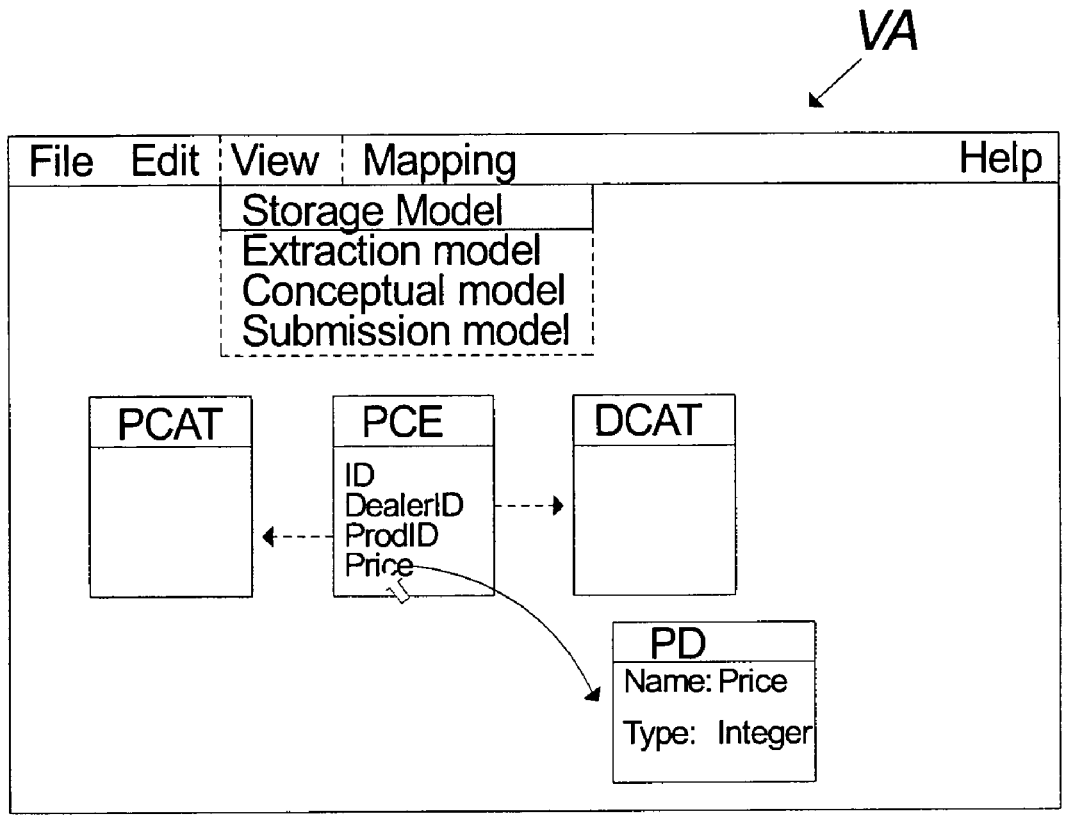
FIGS. 4 to 6 illustrate the principles of one embodiment of a domain modeler according to one embodiment of the invention.
Figure 4B:
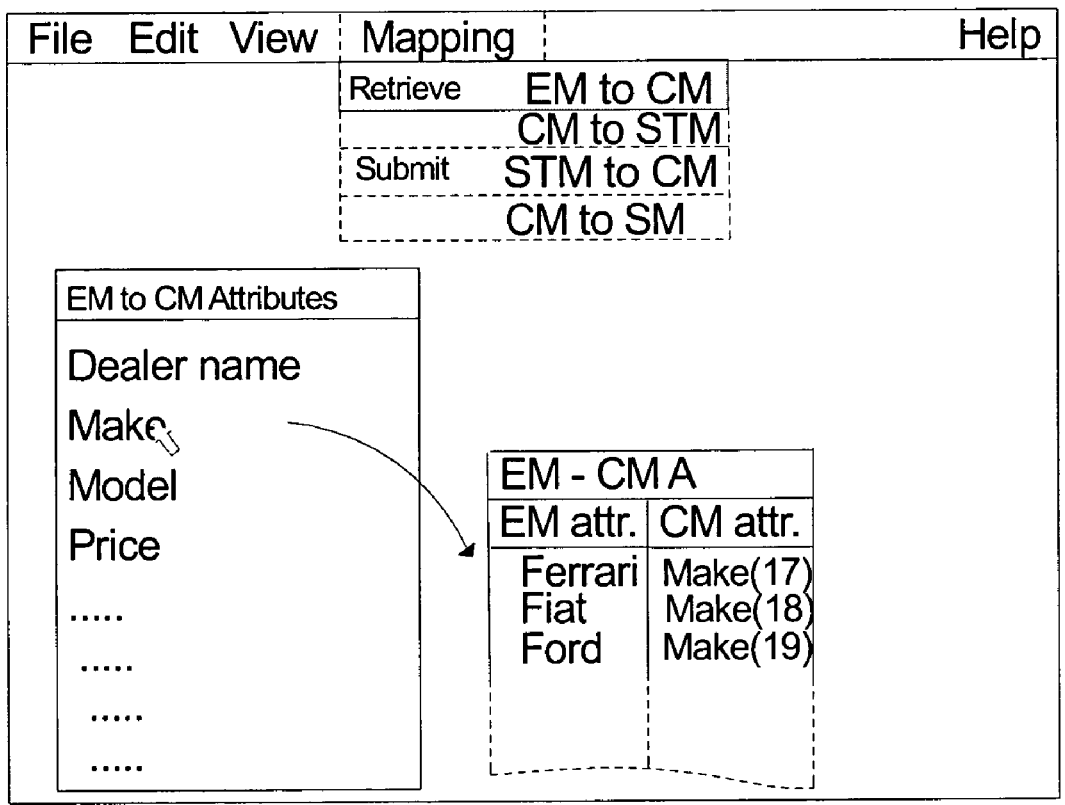
Figure 5:
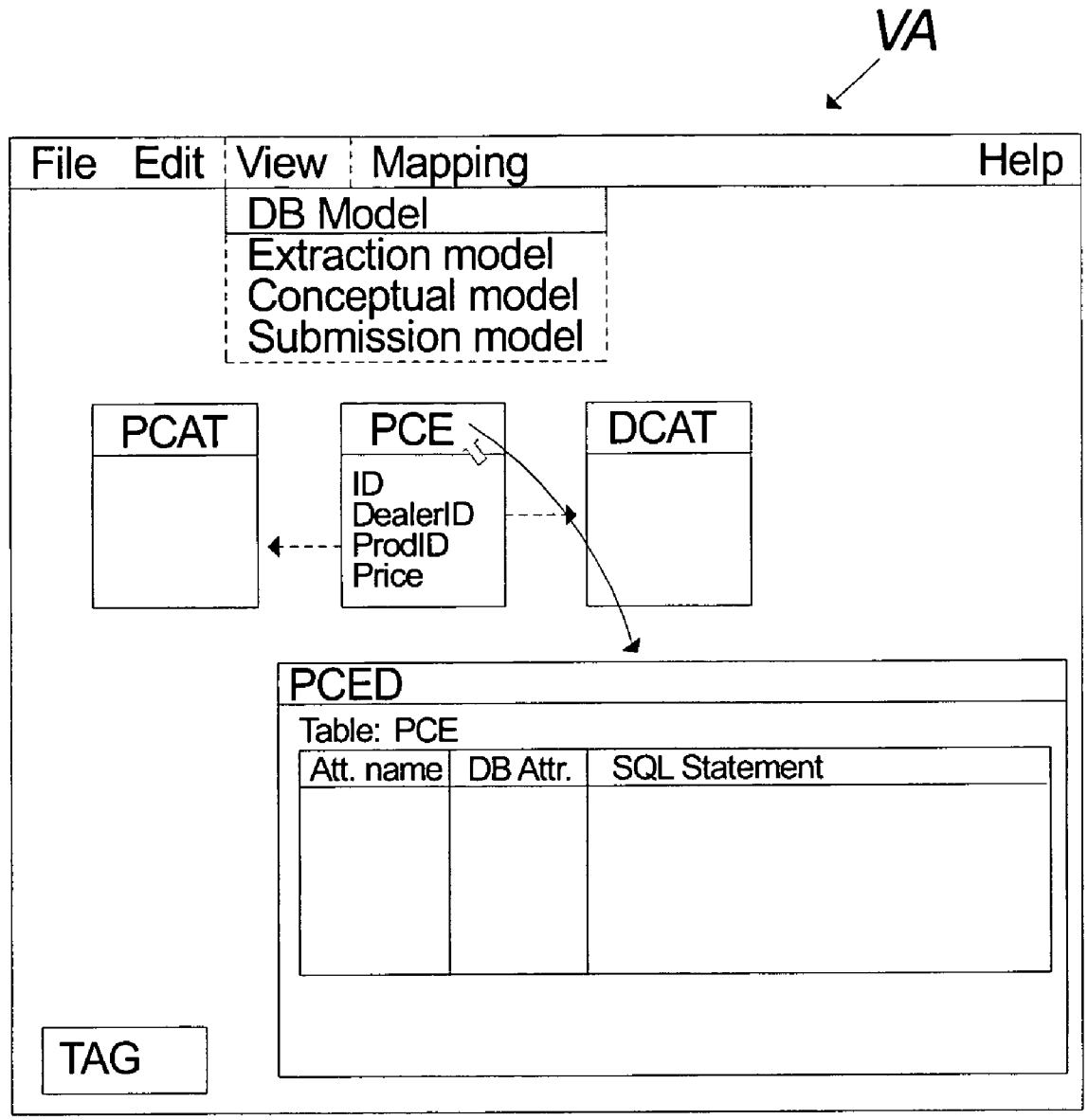
Figure 6:
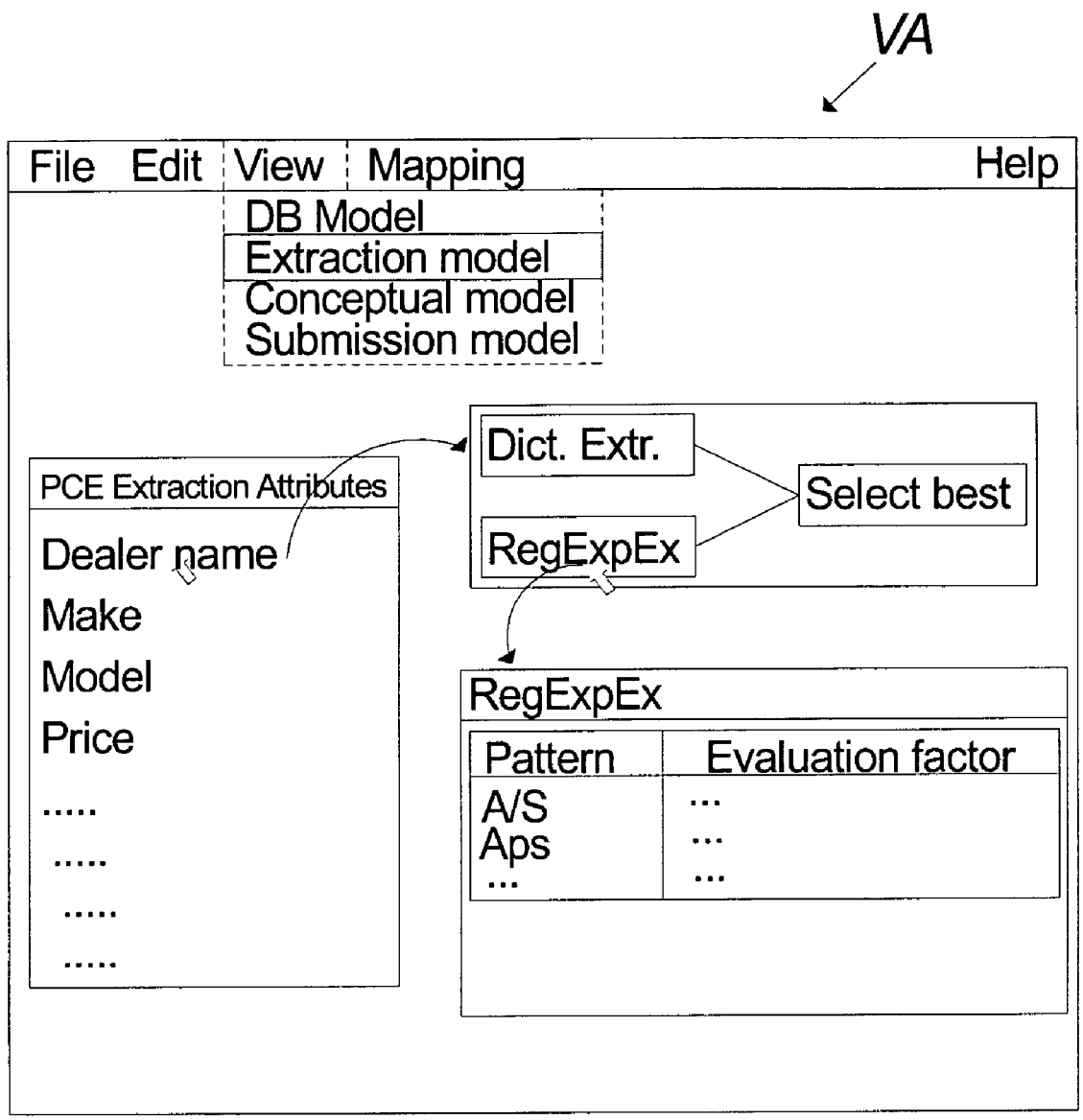

FIGS. 4 to 6 illustrate the principles of a domain modeler according to one embodiment of the invention.

Evidently, the user interface providing the domain modeling features to the user may be established in numerous variants within the scope of the invention.

According to the illustrated embodiment, the relations between the table of the database are made in a selectable "edit" environment. Evidently, a combined view/edit environment is applicable within the scope of the invention.

The illustrated domain modeler comprises an interface having a menu bar comprising four different selectable menus File, Edit, View and Mapping.

FIG. 4a illustrates that the menu View has been selected. The View menu, which is a Relationships Window, may comprise several menu items: Storage model, Extraction model, Conceptual model and Submission model. The models define the different entity models adapted by the complete query processor. Evidently, different kinds of entity models and definitions of entity models may be adapted within the scope of the invention.

The term database model may also be referred to as a storage model.

In FIG. 4a the Database model view has been selected.

The view area VA appearing when selecting Storage Model View illustrates the basic components of the database attached to the domain by means of visual indications of relations between the tables. The database model defines the structure of a database intended for storage and handling of the entities of the domain. A database model is typically a relational database rather than a flat-file database in order to accommodate the knowledge obtained by the query processor.

The Relationships window may be in different "show relationships"—modes, e.g. "Show All Relationships" or "Show Direct Relationships".

The first mode shows all tables of the current database. The other mode shows the tables of the database within the currently selected domain. When selecting the available tables, the viewer will show the relationships to all tables related directly to the selected table.

Basically, this viewing area VA may operate like known visualizing tools adapted for viewing relations between tables of relational databases.

According to the illustrated embodiment, the viewer is in the second mode. An open domain model intended for attachment to a PC distributing domain comprises a PC Equipment table PCE. The illustrated PCE table comprises an ID, DealerID, ProdID and Price. The first is a primary key to the PCE-table, while DealerID and ProdID are foreign keys to the tables DCAT and PCAT, respectively.

The PCE table refers to a product catalogue PCAT and a dealer's catalogue DCAT. The product catalogue PCAT is a table of the products attached to the domain and intended for sale. The dealer's catalogue DCAT is a table of the dealers attached to the domain. Finally, the PCE table refers to price.

Evidently, such a PCE table would typically be more complex, e.g. comprising relations of tables comprising further product characteristics such as color, comments to the products, currency, URL etc.

When double-clicking on the Price field of the PCE table, the Price field definitions appear as a dialogue box PD. This field may be applied for defining the Price field. The illustrated Price field has the name "Price" and the field type may be selected as a string or an integer, here selected as an integer.

FIG. 4b illustrates that the menu Mapping has been selected. The Mapping menu, which is a table or Relationships Window, may comprise several menu items, e.g. the illustrated EM to CM, CM to STM, STM to CM or CM to SM.

The first-mentioned mappings, EM to CM and CM to STM, deal with mappings needed for retrieval of entities from a data source, while the two latter deal with writing, i.e. submission to a data source (e.g. filling-in of a form in a data source to place an order, filling-in of a search form or e.g. insertion of a new entity in the data source.

The EM to CM, Extraction model to Conceptual model mapping, defines the mapping between the entities and/or attributes retrieved according to the extraction model EM into entities and/or attributes according to a conceptual model CM.

The CM to STM, Conceptual model mapping, defines the mapping between the entities and/or attributes held according to the conceptual model CM into entities and/or attributes according to a storage model STM.

The STM to CM, Storage model to Conceptual model mapping, defines the mapping between the entities and/or attributes represented according to the storage model STM into entities and/or attributes according to conceptual model CM.

The CM to SM, Conceptual model to Submission model mapping, defines the mapping between the entities and/or attributes represented according to the conceptual model CM into entities and/or attributes according to a submission model SM.

Evidently, the mapping from one model to another may be performed in several other ways than the table-based method illustrated in FIG. 4b within the scope of the invention.

Thus, the mapping may include direct transformation of a number of associated attributes into a unique object in a relational manner. That is; the bundle of associated extractions is transformed as a whole into one unique object instead of applying the above-mentioned method of initially mapping the extraction attributes into conceptual attributes, and then subsequently establish a unique entity on the basis of a reference system, e.g. a product catalog defining different possible entities of the domain.

The mapping from the extraction model to the conceptual model preferably involves a classifier (i.e. a classification system) that will map extracted entities into conceptual entities according to a product catalogue. That is; the product catalogue may contain various (generic) conceptual entities existing in the domain. After classification, if a classifier is at all available in the domain, the conceptual entities are made unique according to the extracted entities by transferring various attribute values from the extracted entities to the conceptual entities, such as price, URL, currency etc. This transfer of values from extraction entities to conceptual entities is done by selecting and configuring a transfer function that maps one or more extraction model attribute values into one or more conceptual model attribute values.

In FIG. 4b, the EM to CM has been selected.

The view area appearing when selecting EM to CM attributes illustrates the attributes to be converted into conceptual entities, e.g. in the form of a table.

In FIG. 4b, the extraction attribute "Make" has been selected, thereby opening a mapping table where EM-CA A has been selected. The table comprises different applicable mappings between extraction attributes to conceptual attributes, here exemplified by the strings Ferrari, Fiat and Ford converted into integers 17, 18 and 19, respectively.

FIG. 5 illustrates that the PCE table has been double-clicked. A PCE dialogue box appears PCED. This dialogue box facilitates editing of the PCE table defining data, e.g. by insertion of SQL-statements associated with the PCE table, attribute names, etc. Finally, the table may be generated by selecting the Table Generate tag, TAG.

Basically, the storage model may be modeled by known prior art database-generating tools. The important thing when dealing with the database model for the specific domain is to include all necessary attributes and establish an well-structured, easily searchable and quickly accessible database. It should be noted that this structuring of the domain database may be performed independently of the rest of the domain query processor, as long as the necessary entity attributes have been defined.

FIG. 6 illustrates the Domain Modelers Extraction model viewer.

In FIG. 6, the Domain Modelers Extraction model viewer has been selected.

While the database in the database modeler viewer may be regarded as the representation of entities "understood" by the query processor, the domain extraction model to be made by the extraction modeler may be regarded as the definition of relevant attributes included in the syntax of "raw" string-based data of the web-based data sources to be accessed as defined by the data source provider.

Robotmaker

Figure 7:
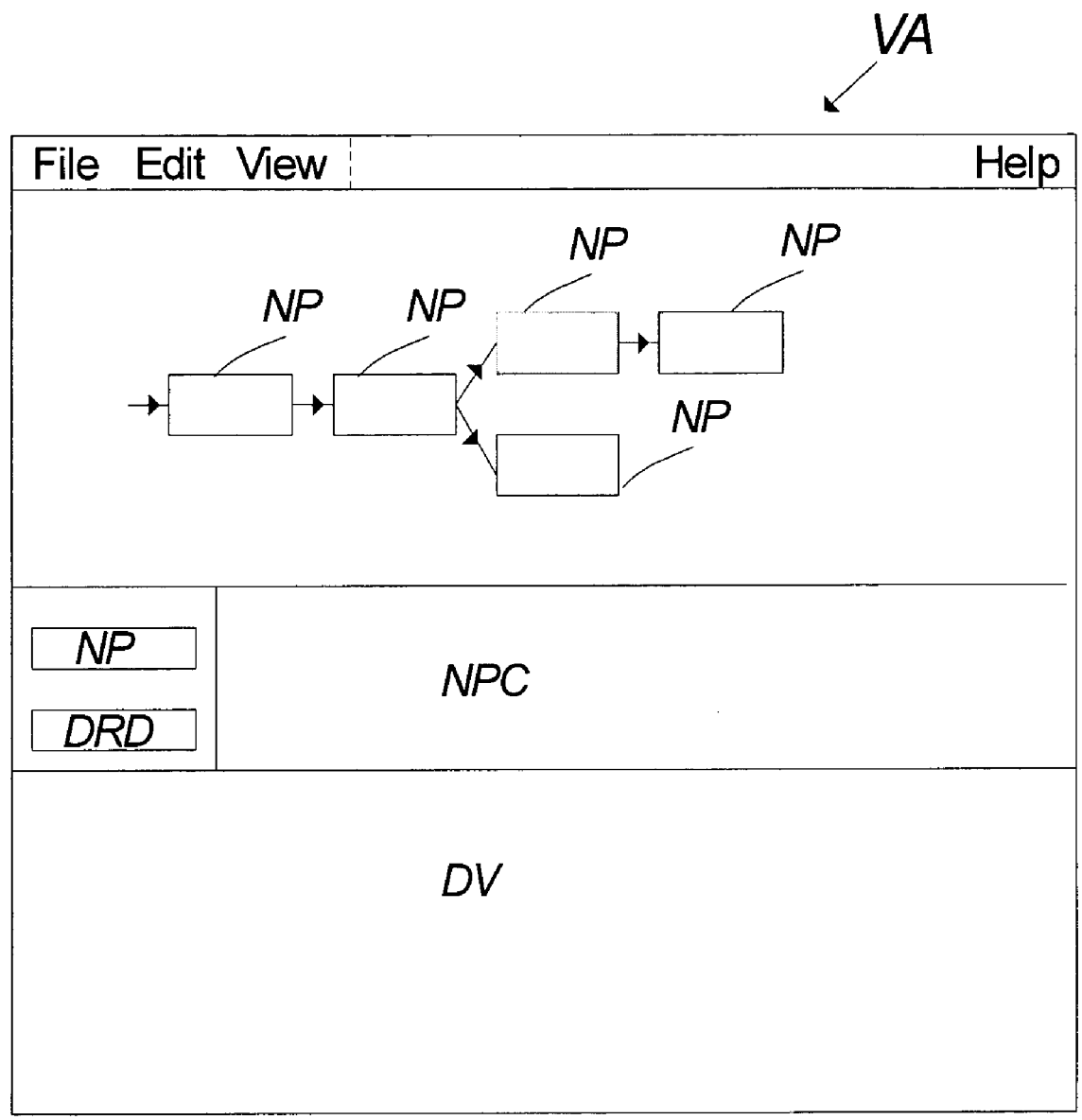
FIG. 7 illustrates the principles of an applicable robot-making program according to one embodiment of the invention.

FIG. 7 illustrates the principles of an applicable robot-establishing program according to one embodiment of the invention.

Evidently, the robots to be used in the query processor may be established and attached to a certain data source in many ways within the scope of the invention.

The main principles of the robot generator mentioned below is to make a robot and assign it to a certain site containing data relevant to the domain of interest, i.e. assign the robot to the site by means of an address, e.g. URL address, and generate a data reader (the robot) capable of reading the data of interest contained in the data source, e.g. a web-site, and transfer these data in a certain data format to the central control of a query processor in response to a query.

Hence, according to a preferred embodiment of the invention, a new and unique robot has to be made for each web-based data source to be queried.

Turning now to FIG. 7, a short overview of this program will be described.

A detailed description of such a robot-generating program may be found in PCT/DK00/00163 and PCT/DK00/00429 filed by the applicant and is hereby incorporated by reference.

The nodes may be arranged in straight-forward paths. However, the nodes are typically arranged in branched IF-THEN paths.

The robot generating program is adapted for establishing sequential access of a web-based data source. The control of this sequential reading is e.g. established by means of a graphical path of node processors NP, each node processor NP performing some configurable processing of its input. The nodes are sequenced in such a manner that a web-based data source, e.g. in HTML, may be traversed and data extracted or submitted. It should be noted that high-volume establishment of such robots is somewhat time-consuming. Hence, the robot-generating programs should be very user friendly or even automatic.

A nodeprocessor selector NPS is adapted for configuration to the current application in the node processor configuration view NPC. Moreover, the nodeprocessor may be attached to a certain document area by means of a document range definer DRD.

Finally, the robot maker viewer comprises a document view which e.g. may be adapted for viewing the XML text of the data source or a part of the data source.

Basically, the robot maker outputs robots and each robot is specialized in operating one dedicated web-based data source.

According to the preferred embodiment of the invention, the robot outputs entities according to the extraction model(s), i.e. non-classified or interpreted data, to a central control, e.g. to a transformer query processor element. Here, the extracted strings may be converted into coded representations, e.g. as objects stored in a database, and the extracted data may then be classified.

Evidently, according to additional/other embodiments of the invention, the established robots may contain transforming means for transformation of extracted data into a conceptual representation, e.g. conversion of a sequence of strings "Ford", "2.0", "red" into an object stored in a database as a "car", which is a red Ford having a 2.0 liter engine. It should be noted that the preferred embodiments of the invention benefit from a more central transformation of entities into conceptual data, thereby reducing the requirements of maintaining decentral transformers.

Query Processor Modeler

A query processor modeler according to the invention is intended for establishment of the "transfer function" between the user, the web data accessing machine and the data located in a web-based data source. The meaning of "transfer function" involves a data flow from the user towards the data accessing machine and/or the web-based data sources. Moreover, the transfer function involves control of the flow of data from web-based data sources towards the web-data extraction machine and/or the user.

According to a preferred embodiment of the invention, this functionality is referred to as a query process flow and the established "accessing machine" is referred to as a query processor. The query processor will preferably be adapted for processing of a certain well-defined domain, e.g. a car domain. It should be noted that some kind of overlapping between the domains may be acceptable in the sense that one query processor may e.g. comprise query processor elements accessing data from different domains. Preferably, the domains should be separated since a query processor should only deal with one domain.

The query processor will be defined in a query process graph below by means of a visual programming tool.

Figure 8:
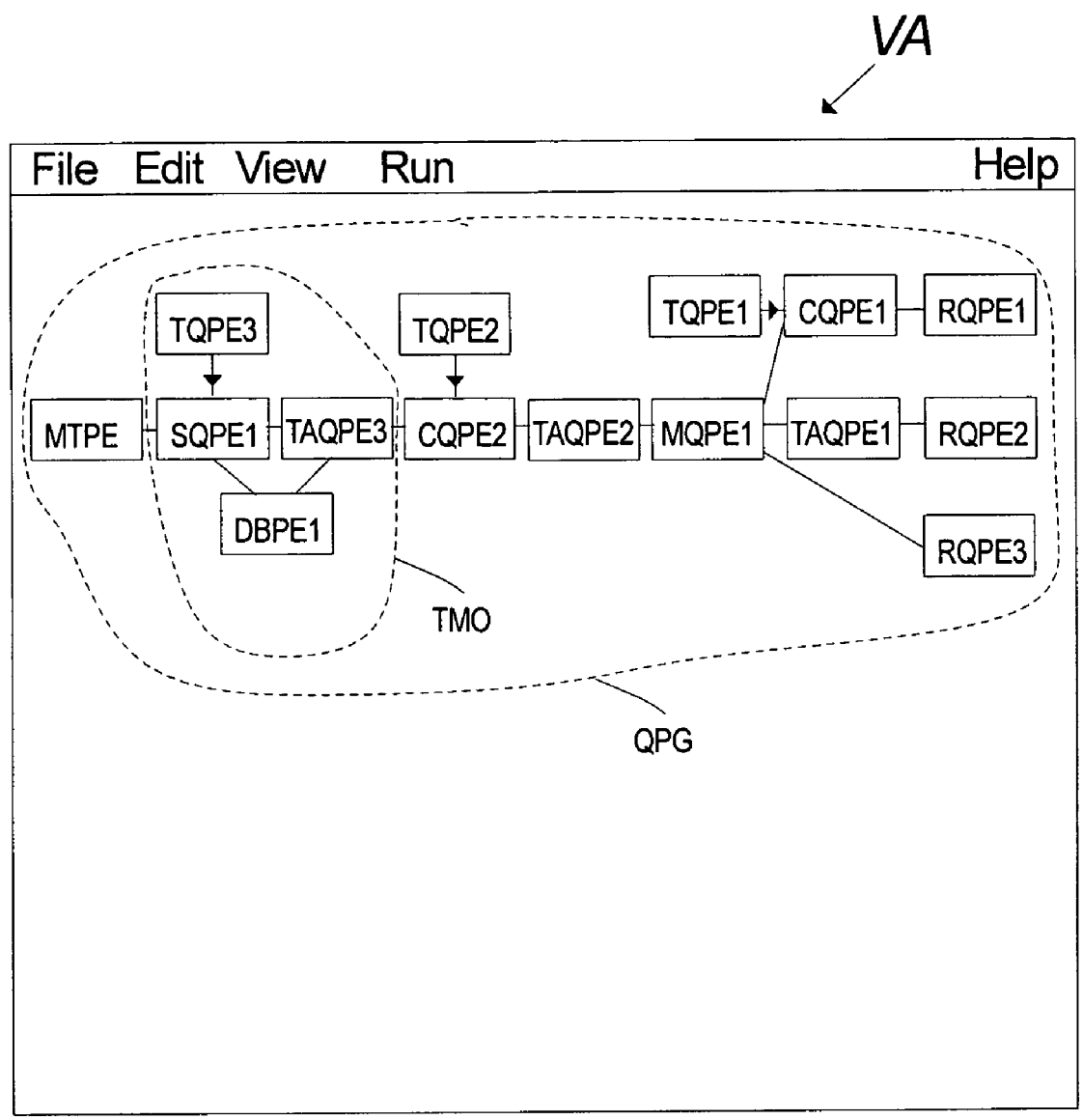
FIG. 8 illustrates the functionality of a query processor modeler according to one embodiment of the invention and FIG. 9 illustrates a possible user interface of a domain execution manager.

FIG. 8 illustrates a preferred embodiment of the invention involving a visual programming tool for establishing the above-mentioned transfer function by means of a query processor graph QPG.

According to a preferred embodiment of the invention, the query processor modeler comprises a visual and programmable editor. The illustrated editor facilitates the combination of a number of Query Processor Elements QPE into a query processor graph. The query processor elements may be of different types defined by their main functions.

Initially, a short introduction of query processor elements will be provided.

An example of a query processor element QPE may e.g. be a robot, such as a robot query processor element RQPE. A robot query processor element RQPE is adapted for accessing web-based data sources upon request. A single robot may typically be attached to one single data source.

Evidently, a robot query processor element may also be adapted for reading only or writing only if suitable.

Another example of a query processor element QPE may e.g. be a cache, such as a cache processor element CQPE. Such an element is adapted for returning a response to a query or it may guide the query further on in the process if the cache contains no answer to the query. A further possibility is that the cache element CQPE returns a part of the response which may be established by means of the entities already contained in the cache, and forward a query further upstream in the processor in order to establish the rest of the response.

A further example of a query processor element QPE may e.g. be a so-called mediator query processor element MQPE. This element is adapted for distributing an incoming query to other query processor elements and for gathering the response returned by these queried processor elements, e.g. robots, and returning the answer back to the processor which queried the mediator MQPE.

Another query processor element may be of a trigger type, i.e. a trigger processor element TPE adapter, for triggering a certain operation or a query.

The trigger processor element TQPE is adapted for initiating a certain action, e.g. an automatically scheduled initiation of a query, an automatic trigger processor element ATPE. Another applicable trigger processor element TPE may e.g. be a trigger adapted for initiation of a query upon request by a user, i.e. a manually activated trigger MTPE. It should be noted that the latter trigger processors represent another type of query processor elements than the first. The trigger query processor element is not activated by an incoming query but at its own initiative. Hence, a manually operated trigger element MTPE may be regarded as an element including a user.

Turning now to FIG. 8, the figure illustrates a query processor adapted for processing a certain domain. According to the illustrated embodiment, the domain comprises three web-based data sources. The illustrated query processor QP is constructed and monitored by means of a visually programmed drag- and drop query processor graph QPG. The establishment of this query processor graph may also include the configuration of the individual query processor elements. The configuration of e.g. a robot may thus be performed by means of an embedded robot modeler which may be activated via the Query Processor Modeler.

The illustrated query processor graph comprises three robot query processor elements RQPE1, RQPE2 and RQPE3.

Each robot is attached to a specific, dedicated data source, i.e. determined by the URL of the data source. Each robot is made automatic or semi-automatic by means of a robot modeler RM, both referred to as robot maker and robot modeler RM in this application. The robots RQPE1, RQPE2 and RQPE3 are adapted for accessing, i.e. reading and/or writing, the associated data source (not shown) according to a read/write pattern defined and associated with the individual robots. This defined read/write pattern enables each robot to access the corresponding data source. According to a preferred embodiment of the invention, there is a one-to-one relationship between the robots and the data sources, i.e. one web-based data source is accessed by one robot only. The read/write pattern in the robot is typically highly specialized in order to fit the specific data structure of the associated data source. It should be noted that web-based data structures are typically programmed and structured independently, e.g. in HTML tables or other more or less unforeseeable data structures.

The establishment of a read/write pattern may also be referred to as a creation of a robot.

Evidently, the invention offers different web-based data source owners the possibility of entering their data in a data structure which is easy to access by the query processor. Such easy access may e.g. be provided to the data source owners in the form of design requirements if they want their data source to be roboted. Likewise, the query processor may also include data-accessing robots, e.g. by featuring direct ODBC access to the database of the data owner. Thus, it will sometimes be possible to assign a standard robot type to such generalized data source if so desired.

According to a preferred embodiment of the invention, requirements to the data source owner will be kept low, thereby offering the possibility of accessing numerous different data sources.

Turning now to the defined robot query processor element RQPE1, this robot is dedicated to a specific web-based data source and communicates with a query processor element in the form of a cache CQPE1. The cache may be activated by a trigger TQPE1. This trigger element TQPE1 may initiate a certain trigger-defined query subsequently performed by the robot query processor element RQPE1.

The cache element CQPE1 may e.g. be provided as an encapsulation of the robot's data source. This direct and local pre-cache operation on one data source provides the possibility of reducing access time to certain data of the data source operated by the robot RQPE1. Evidently, this facility is attractive for the purpose of bootstrapping the cache with entities (data of the data structure of the data source) that are often queried. The trigger element TQPE1 should typically ensure that data often queried are updated regularly according a preferred embodiment of the invention in order to avoid a completely empty cache. Evidently, this control may also be integrated in the cache CQPE1 within the scope of the invention. The cache CQPE1 is a coupled mediator query processor element MQPE1. The functioning of the mediator MQPE1 will be described below. Moreover, the cache element CQPE1 may e.g. be adapted with the purpose of reducing the load on the specific site roboted by the robot element RQPE1 in a more strict sense, as the cache may be adapted for returning entities stored in the cache without querying the robot irrespective of the fact that the entities stored in the cache are not completely updated. Thus, the local cache element CQPE1 may thus set a minimum interval for activation of the robot RQPE1, thereby ensuring that each and every query not does necessarily result in a query of the data source. This application of a cache may ensure that a certain site is not overloaded by the robot.

A further robot query processor element RQPE2 is dedicated to a specific web-based data source and communicates with a query processor elements in the form of a transformer TAQPE1. The transformer element TAQPE1 is adapted for receiving a query from a user-activated query element MPTE located downstream to the located data sources located upstream. The illustrated transformer element TAQPE1 channels an unmodified query further on to the robot query processor element RQPE2. Subsequently, when the robot RQPE2 returns a reply to the query, the response may be modified by the transformer before being returned to the connected mediator MQPE1. Such a modification may e.g. be established as a trivial mapping of km: 34 to be read as km: 34,000 or the like. Preferably, utilization of transformers for such purposes should be made when certain data sources, e.g. web-site, use certain terms deviating from the general terms applied by other data source providers within the domain.

The system comprises a further robot query processor element RQPE3 dedicated to a specific web-based data source. This robot RQPE3 is directly coupled to the mediator MQPE1.

The mediator MQPE1 is applied for branching the query process path into several different paths, e.g. three as illustrated. During the return path, the mediator collects the information obtained by the queried robot branches and returns the data to a transformer element TAQPE2.

This transformer element TAQPE2 defines a principle borderline between the upstream robots RQPE1, RQPE2 and RQPE3 and the downstream user U as the transformer performs a transformation of data retrieved by the robots into conceptual data according to a conceptual model associated with each robot. These conceptual data are handed over from the transformer element TAQPE2 to a cache query processor element CQPE2. Typically, the conceptual model should be common for all involved elements dealing with entities in a conceptual manner.

The cache element CQPE2 may be regarded as the main storage means for the query processor QP intended for storage of the currently updated entities retrieved by the robots of the query processor.

The nature of the cache may vary significantly from application to application. In some applications, the cache may comprise only recently entered conceptual data, while caches in other applications may comprise a more or less complete database of the entities comprised in the data sources associated with the domain processor.

The cache CQPE2 may be activated by a trigger query processor TQPE2.

This trigger may e.g. be adapted for refreshing the cache CQPE2 according to scheduled trigger criteria. The trigger criteria may both be established on the basis of user query statistics and/or statistics associated with data stored in the cache CQPE2.

The data contained in the cache CQPE2 are conceptual data.

The cache CQPE2 are coupled to a user interface represented by a manually operated trigger element MTPE located downstream of the query processor graph via a tracking module TMO adapted for gathering and storing data. The gathered data are used for keeping track of the history of data contained in the data sources of the domain and for establishing and maintaining query statistics. This tracking module is a combination of a number of query processor elements QPE.

Basically, the module comprises a storing query processor element SQPE1 adapted for writing data into a database query processor element DBPE1. The database DBPE1 comprises entities retrieved from the associated domain of data sources and the entities are stored according to a preferred storage model. The storage may also contain history-describing data or data from which the entities may be deduced. The storing query processor element SQPE1 may be activated by both a user query or a trigger query TQPE3. The trigger query processor element TQPE3 is intended to maintain and establish desired data, such as prices of cars or the like and thereby offer the possibility of registering if an entity comprised in a data source covered by the domain processor has offered another price etc.

Finally, the illustrated query processor path comprises a transformer element TAQPE3. This transformer element is primarily responsible for transforming conceptual data into storage data in the database DBPE1.

Short explanations of some of the above-mentioned query processor elements will be provided below.

Generally, according to a preferred embodiment of the invention, the query processor elements should function without any knowledge of the context.

The Cache Query Processor Element

A cache query processor element according to the invention may implemented in many ways. Generally, the cache should (as a traditional cache) contain some of the entities recently read from one or some of the data sources. The idea of applying a cache should generally be that of reducing access time to the data sources. Generally, the cache may be controlled in many ways, depending on the purpose. Thus, the cache may be activated from time to time by an automatic trigger with the purpose of refreshing the content of the cache with respect to certain types of entities. Triggering of the cache would then imply that the triggered cache forwards a query to the relevant data sources of the domain, collects the response and writes the returned entities into the memory. Obviously, triggering of the cache may be constructed in numerous ways within the scope of the invention as long as the main purpose of the triggering is to obtain the best possible performance of the current application. Evidently, in some domains, the cache should not be applied for entities exceeding a certain age, e.g. 3 minutes, if the nature of the entities contained in the domain are changing quite often.

An example of advantageous triggering according to the invention may e.g. be that of triggering the cache with the purpose of refreshing the cache with entities often queried by the users of the query processor. This boot-strapping ensures that start-up time is reduced by maintaining the often queried entities in the cache. The statistical control may therefore imply triggering of the cache which may vary dynamically, i.e. be controlled by the user request.

A further possible approach may e.g. be triggering of the whole domain once a day which means that all relevant data contained in all data sources of the domain are read into the cache and that all data are updated at least once a day. Evidently, according to the latter strategy, the cache is controlled in a manner resembling a kind of persistent database.

The Transformer Query Processor Element

The transformer query processor element is basically an element which may transform an incoming query or entity to another query or entity. Hence, the transformer works both ways: downstream and upstream.

Applicable transformer elements may e.g. be transformers transforming raw extracted text-string entities received from upstream (e.g. from a robot) into entities in a conceptual representation of the entities read from the data-source according to a preferred embodiment of the invention.

Further possible transformer elements may e.g. be a transformer receiving conceptual entities and outputting the entities according to a data storage model.

A further, and more simple transformer, may e.g. be a mute transformer element, arranged in front of a robot or in a certain branch. This mute may be adapted for blocking the entity or query stream in the respective branch. Such a mute transformer may e.g. be advantageous if a certain robot must receive maintenance, thereby offering the possibility to an operator of maintaining a query processor to modify or exchange a certain robot without modifying the query process graph. Hence, a robot may be maintained without simultaneously receiving a stream of queries. It should be noted that the transformers may by arranged in many different positions in the query graph within the scope of the invention.

Trigger Query Processor Element

The trigger query processor element comprises means e.g. for invoking a query in an element associated with the trigger. The trigger may then comprise a schedule adapted for defining fixed time intervals which determine when to query the associated element, e.g. a cache. Likewise, the trigger may comprise calculation algorithms adapted for calculating suitable trigger conditions, e.g. when to query, and/or how to query. Therefore, the trigger may advantageously comprise statistical evaluation means.

Mediator Query Processor Element

A mediator query processor element MQPE is adapted for distributing an incoming query to other query processor elements and for gathering the response returned by these queried processor elements, e.g. robots, and returning the answer back to the processor which initially queried the mediator MQPE.

Hence, the mediator may show several different levels of intelligence, from the somewhat simple and uncomplicated branch element simply distributing an incoming query to a number branching elements, to quite intelligent elements capable of distributing an incoming query to the branches most likely comprising the queried entities.

A mediator may deal with data according to any representation, e.g. conceptual entities, storage entities or extraction entities.

Messenger Query Processor Element

Other possible types of query processor elements to be included in the query processor graph may e.g. be MESQPE Messenger query process elements. The messenger elements MESQPE are adapted for monitoring the process of the individual QPE's or between the QPE's. These messengers may e.g. be adapted for returning a processor's state-describing parameters to an operator responsible for the query processor or the query processor element. Messengers may e.g. be adapted for providing statistical material or fault warnings.

It should be noted that the conceptual building of the domain processor may be performed in many different ways. This means that the word "element" and the word "graph" should in no way restrict the scope of the invention in the sense that the wording primarily reflects the functional understanding of the elements. Evidently, other types of elements may be derived within the scope of the invention, e.g. elements combined on the basis of the above-mentioned elements. Examples of such possible derivatives within the scope of the invention may e.g. be a robot processor comprising a transformer (i.e. the robots read extraction entities, transform the data to conceptual entities, and return the entities to a central control, e.g. a database; e.g. a cache comprising a transformer, e.g. cache comprising a trigger, etc.)

A further advantageous messenger may e.g. be a messenger adapted for raising a flag to the operator managing the query processor when the entities to be transformed into conceptual data are not contained in a reference product catalogue, thereby offering the operator the possibility of updating such a catalogue locally or globally.

Other advantageous elements may e.g. be elements directly adapted for reading a well-known database, i.e. by means of ODBC drivers, thereby making it possible for extracted reading of "foreign" web-based data sources to be supplemented by readings from few or several databases comprising entities included by the domain.

According to the invention, each of the present elements may be activated by clicking on the element in the editor, thereby initiating/activating the element-creating application. Hence, the RobotMaker application will be activated by double-clicking on a selected robot, e.g. RQPE1, and the Domain Modeler will be activated when double-clicking on e.g. the transformer TAQPE2.

When the query processor graph QPG has been established, the graph may be saved, thereby maintaining the properties of the complete query processor QP.

The structure and functioning of the individual query processor elements are defined by means of the domain modeler DMR and the Robotmaker RM. Evidently, some of the query processor elements are domain independent in the sense that they may be included in the query processor graph of several different types of query processors DP, e.g. trigger processor elements with little or no modification, whereas other query processor are somewhat domain specific. An example of a domain independent query processor element may e.g. be the aforementioned mute transformer element which may be applied by any desired domain without pre-modification.

It should be noted that the Query Processor Modeler may even, and preferably, include query processor execution tools included in the illustrated "view" setup. Such a setup may include the illustrated view which, when in run mode, illustrates the running state of the query processor and the individual elements. An example of such intuitive processing is that the individual elements change color according to the state, e.g. within a color range from white to red, depending on the load of the elements.

Moreover, the interface, e.g. the illustrated view, should preferably visually illustrate basic on-off conditions, i.e. illustrate actively if an element is working properly, and whether entities are transferred between the query processor elements and preferably whether entities may actually be transferred between elements. The latter feature may ease operation of the system significantly due to the fact that the absence of an entity flow between the elements does necessarily indicate that a fault-condition has occurred simply because the element is not queried.

Determination of a "clear road" between the elements may e.g. be established by forwarding dummy (testing) queries between elements at certain intervals.

Moreover, the Query Processor Modeler may include submenus facilitating specialized execution of the query processor. Such a submenu is illustrated in FIG. 9, and it may e.g. be selected by the "run" drop down menu of the Query Processor Modeler.

Moreover, the Query Processor Modeler may feature specialized visualization of certain groups of query processor elements. Thus, a "robot element" viewer may be activated, thereby offering the operator the possibility to concentrate fully on his task, e.g. maintenance or design of robot elements and thereby ignore elements dealt with by other operators.

It should be noted that a query processor according to the invention may easily comprise several hundreds of robots.

Likewise, other designers may advantageously activate a "no robot view" while designing the main body of the query processor.

It should also be noted that the above-mentioned examples of elements may be combined into groups of macro-elements, e.g. of a robot element comprising a transformer, etc.

Figure 9:
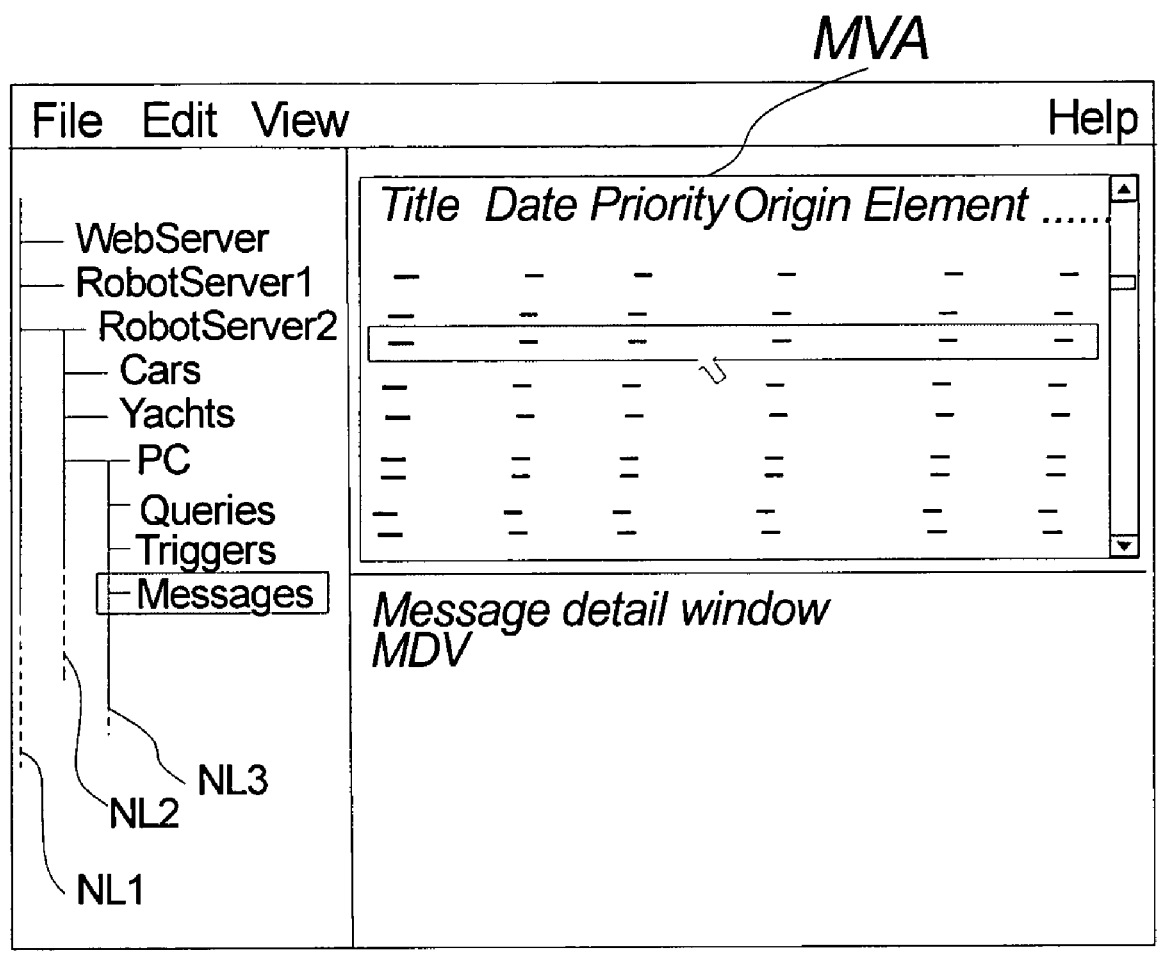

FIG. 9 illustrates a possible user interface of a domain processor DP. A domain processor is adapted for supporting maintenance of one or several query processors QP when established.

The illustrated user interface of a domain processor comprises a tree-based structure monitoring area. One domain processor may control execution and maintenance of several different domains.

This area monitors a first level of node-represented servers NL1. This level illustrates different servers applied, Web-Server, RobotServer1, RobotServer2. A second node level NL2 shows the current domains controlled by the domain server, e.g. Cars, Yachts and PC's. A third level NL3 illustrates different selectable query processor state-indicating functions, e.g. queries, triggers and messages. The function Messages has been selected in the illustrated view.

It should be noted that the term server referred to in level 1 NL1 may both reflect a physical location of a query processor with respect to a server, or it may refer to a kind of virtual server comprising several different servers, each processing their part (e.g. element or groups of elements) of the query processor.

Moreover, the illustrated viewer comprises a message viewing area MVA adapted for viewing messages forwarded automatically by e.g. different unique elements of a query process path or groups of elements. The attributes of listed messages may e.g. be chosen as the illustrated Title, Date, Priority, Origin Element.

The viewer may moreover facilitate a filtering of the individual elements of the original element. Hence, an operator may e.g. establish a filtering of messages from a certain element, Original Element, or of groups of elements, e.g. mediators or transformers.

Moreover, the viewer comprises a message detail window MDW. This viewer may illustrate details about a single message or groups of selected messages in the messages view area MVA. Each message may e.g. be associated with a startup-facility with the purpose of activating the editor or editors associated with the individual message.

A query element program, e.g. a robot editor, may be started directly from the domain processor DP, e.g. by automatically importing the data from an element selected in the viewer such as a specific robot.

The invention claimed is:

1. A Query Processor Modeler, comprising:
means for selecting at least two Query Processor elements from a set of predefined query processor elements;
means for attaching at least one selected robot query processor element to a dedicated data source of the data sources of the domain;
means for combining at least two of the selected Query Processor elements; and means for executing said associated query processor elements on at least one computer system;
and at least one of said query processor elements of the associated query processor elements being a Robot Query Processor Element adapted for accessing a dedicated web based data source, wherein the Query Processor Modeler further comprises a graphical user interface in a form of a visual programming tool
means for customizing the at least one individual robot query processor element to the corresponding attached data sources;
means for customizing at least one trigger query processor element to the query processor;
and means for storing said combination of the selected Query Processor elements on a storage medium.

2. A Query Processor Modeler, comprising:
means for selecting at least two Query Processor elements from a set of predefined query processor elements;
means for attaching at least one selected robot query processor element to a dedicated data source of the data sources of the domain;
means for combining at least two of the selected Query Processor elements; and means for executing said associated query processor elements on at least one computer system; and at least one of said query processor elements of the associated query processor elements being a Robot Query Processor Element adapted for accessing a dedicated web-based data source, wherein at least one of said of query processor elements of the associated query processor elements, is a trigger query processor element
means for customizing the at least one individual robot query processor element to the corresponding attached data sources;
means for customizing the at least one trigger query processor element to the query processor;
and means for storing said combination of the selected Query Processor elements on a storage medium.

3. A Query processor, comprising:
a set of web-based data sources, wherein at least two of said data sources comprise entities according to a domain model;
and at least three query processor elements,
at least two of said query processor elements comprising a robot,
said robot being attached to a dedicated data source,
said robot comprising means for accessing information from the at least one data source according to at least one extraction model associated with said robot,
at least one of said query processor elements comprising a trigger query processor element, said trigger query processor element comprising means for establishing a query, or at least one of the query processor elements comprises a transformer query processor element, a messenger query processor element or a mediator query processor element means for selecting at least two Query Processor elements from a set of predefined query processor elements;
means for attaching at least one selected robot query processor element to a dedicated data source of the data sources of the domain;
and means for combining the selected query processor elements into a query processor by means of a graphical user interface wherein said graphical user interface defines a query processor element path visually on a drag and drop basis;
and means for storing said combination of the selected Query Processor elements on a storage medium.

4. A Method of establishing at least one query processor, said query processor comprising a set of web-based data sources, wherein at least two of said data sources comprise entities according to a domain model, said query processor comprising at least three query processor elements, at least two of said query processor elements comprising a robot, said robot comprising means for accessing information from the a dedicated data source according to at least one extraction model associated with said robot, at least one of said query processor elements comprising a trigger, said trigger query processor element comprising means for establishing a query, said method comprising:
selecting at least two Query Processor elements from a set of predefined query processor elements;
attaching at least one selected robot query processor element to the dedicated data sources of the domain;
combining the selected query processor elements into a query processor by means of a graphical user interface wherein said graphical user interface defines a query processor element path visually on a drag and drop basis
customizing the at least one individual robot query processor element to the corresponding attached data sources;
customizing the at least one trigger query processor element to the query processor;
and storing said combination of the selected Query Processor elements on a storage medium.

5. A Method of establishing at least one query processor, said query processor comprising a set of web-based data sources, wherein at least two of said data sources comprise entities according to a domain model, said query processor comprising at least three query processor elements, at least two of said query processor elements comprising a robot, said robot comprising means for accessing information from the a dedicated data source according to at least one extraction model associated with said robot, at least one of said query processor elements comprising a trigger, said trigger query processor element comprising means for establishing a query, said method comprising:
selecting at least two Query Processor elements from a set of predefined query processor elements;
attaching at least one selected robot query processor element to the dedicated data sources of the domain;
combining the selected query processor elements into a query processor by means of a graphical user interface, wherein at least one of the combined query processor elements comprises a transformer query processor element, a messenger query processor element, or a mediator query processor element;
customizing the at least one individual robot query processor element to the corresponding attached data sources;
customizing the at least one trigger query processor element to the query processor.

6. Method of establishing at least one query processor, said query processor comprising means for accessing data from web-based data sources of a domain by means at least one user interface, said method comprising:

selecting a number of query processor elements, at least one of said selected query processor elements being a robot query processor element, at least one of said selected query processor elements being a trigger query processor element;

attaching at least one selected robot query processor element to a dedicated data source of the data sources of the domain;

combining the selected query processor elements into at least one query path defining the data flow in the query processor between the user interface and the web-based data sources of the domain, wherein at least one of the combined query processor elements comprises a transformer query processor element, a messenger query processor element, or a mediator query processor element;

customizing the at least one individual robot query processor element to the corresponding attached data sources;

customizing the at least one trigger query processor element to the query processor;

and storing said combination of the selected Query Processor elements on a storage medium.

* * * * *